(12) United States Patent
Maehara

(10) Patent No.: US 6,186,294 B1
(45) Date of Patent: Feb. 13, 2001

(54) DRUM BRAKE

(75) Inventor: Toshifumi Maehara, Saitama (JP)

(73) Assignee: Akebono Brake Industry Co., LTD, Tokyo (JP)

(*) Notice: Under 35 U.S.C. 154(b), the term of this patent shall be extended for 0 days.

(21) Appl. No.: 09/102,762

(22) Filed: Jun. 23, 1998

(30) Foreign Application Priority Data

| Jun. 26, 1997 | (JP) | 9-170546 |
| Jun. 30, 1997 | (JP) | 9-174359 |
| Jul. 2, 1997 | (JP) | 9-177231 |
| Aug. 28, 1997 | (JP) | 9-232740 |

(51) Int. Cl.[7] .................................................. F16D 51/00
(52) U.S. Cl. ........................................ 188/325; 188/106 F
(58) Field of Search .................................. 188/362, 369, 188/364, 106 P, 106 A, 106 R, 106 F, 325, 328

(56) References Cited

U.S. PATENT DOCUMENTS

| 1,915,857 | * | 6/1933 | Loughead | 188/364 |
| 2,330,883 | * | 10/1943 | Hanna | 188/362 |
| 2,351,952 | * | 6/1944 | Goepfrich | 188/364 |
| 2,697,495 | * | 12/1954 | Schnell | 188/362 |
| 2,867,297 | * | 1/1959 | White | 188/364 |
| 4,266,640 | * | 5/1981 | Woo | 188/364 |
| 4,286,504 | * | 9/1981 | Carre et al. | 188/364 |
| 4,415,209 | * | 11/1983 | Schnopper | 188/364 |
| 4,449,757 | * | 5/1984 | Rath et al. | 188/364 |

* cited by examiner

Primary Examiner—Douglas C. Butler
Assistant Examiner—Robert A. Siconolfi
(74) Attorney, Agent, or Firm—Morgan, Lewis & Bockius LLP

(57) ABSTRACT

A drum brake includes a first brake shoe, a second brake shoe and disposed opposite the first brake shoe within a brake drum, a backing plate supporting the first and second brake shoes, a wheel cylinder disposed between the first brake shoe and the second brake shoe, the wheel cylinder including a drive piston for pressing the first and the second brake shoes against an inner surface of the brake drum, a control piston for supplying hydraulic pressure in response to a braking reaction force from the second brake shoe, an anchor portion for receiving an anchor reaction force from the second brake shoe, a control lever for distributing the anchor reaction force to the anchor portion and to the control piston when the anchor reaction force reaches a predetermined braking force magnification, the drive piston has a base end in the pressure chamber and a leading end facing the first end of the second brake shoe and is movable to and from the second brake shoe by the hydraulic pressure supplied to the pressure chamber, and a control chamber is pressurized by a hydraulic pressure from a master cylinder, wherein the control piston is aligned with the drive piston, and the control piston cuts off a supply of the hydraulic pressure to the pressure chamber when the control piston is displaced into the control chamber by the anchor reaction force.

10 Claims, 18 Drawing Sheets

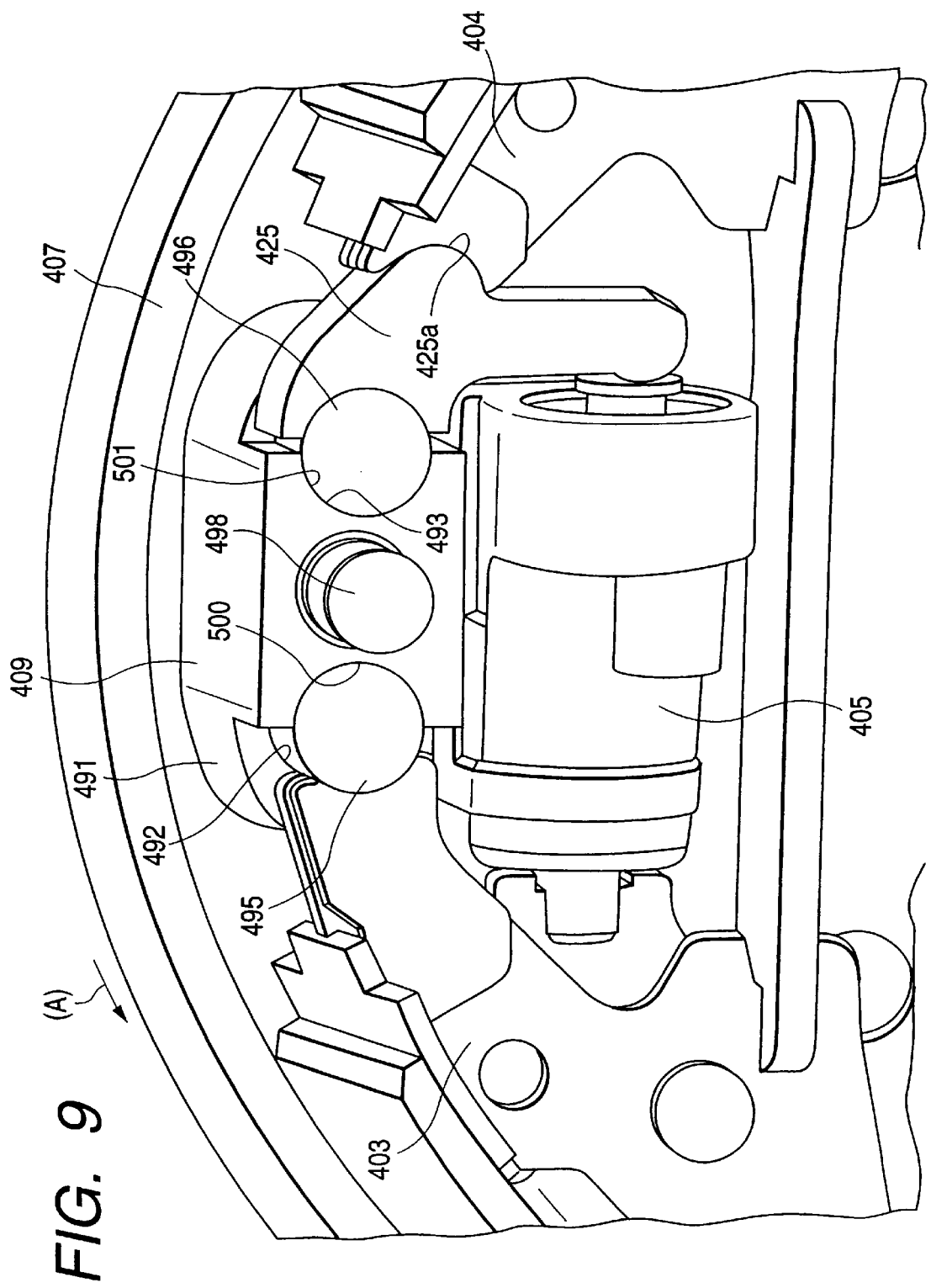

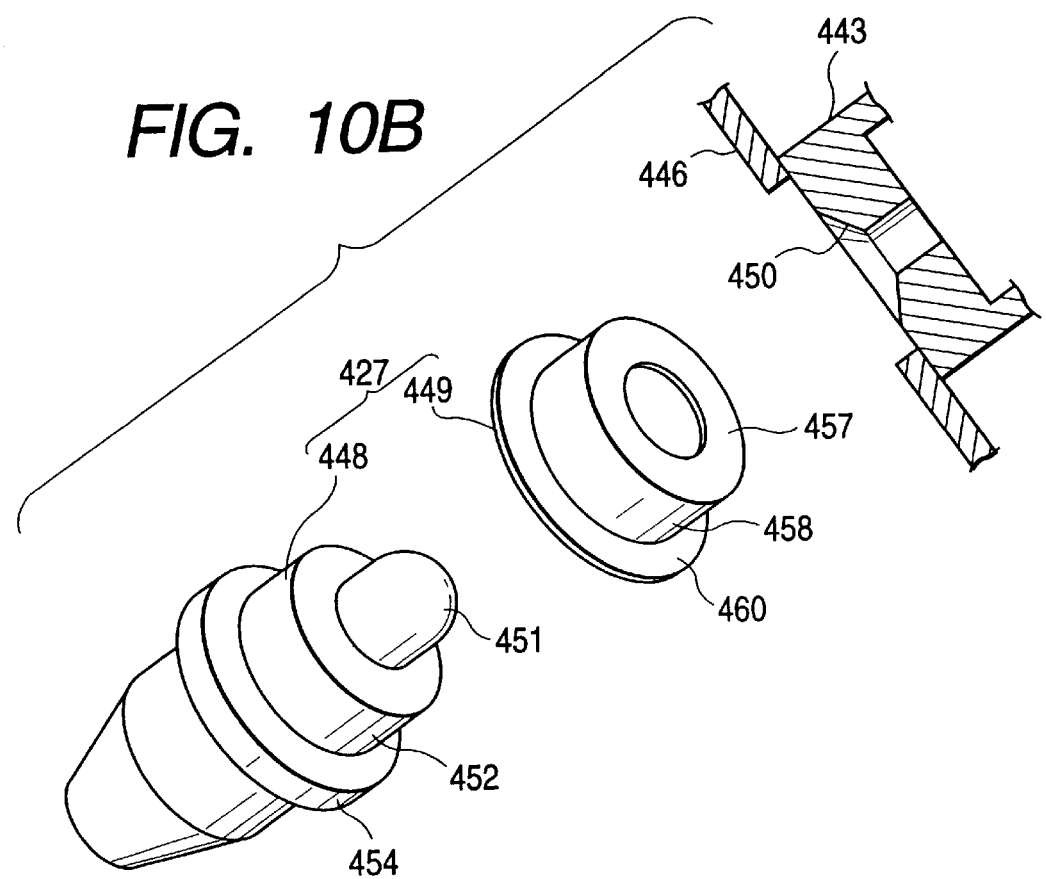

DRUM BRAKE

This application claims the benefit of Japanese Patent Application No. Hei. 9-170546, filed Jun. 26, 1997, which is hereby incorporated by reference.

BACKGROUND OF THE INVENTION

1. Field of the Invention

The present invention relates to a drum brake, and more particularly, to a drum brake having a wheel cylinder for expanding a pair of brake shoes.

2. Discussion of the Related Art

A drum brake used in a vehicle generally includes a wheel cylinder, brake shoes expanded by a force derived from the wheel cylinder to generate a braking force, and an anchor portion that supports the brake shoes and receives an anchor reaction force from the brake shoes.

A brake shoe having one end coupled to the wheel cylinder that is located close to an entrance of the brake, and having another end coupled to the anchor portion that is located close to an exit of the brake, is called a leading shoe. A brake shoe having one end coupled to the anchor portion that is located close to the entrance of the brake, and having another end coupled to an input portion that is located close to the exit of the brake, is called a trailing shoe.

Drum brakes widely used at present include a leading trailing drum brake, a two leading drum brake, and a duo servo drum brake.

The leading trailing drum brake has a pair of oppositely disposed brake shoes. A wheel cylinder for expanding the paired brake shoes is disposed between the first ends of the paired brake shoes. An anchor portion is disposed between the second ends of the paired brake shoes. The leading shoe and the trailing shoe are incorporated into the drum brake.

The leading trailing drum brake has good braking stability, and the assembly of a parking brake into the drum brake structure is easy.

The two leading drum brake uses two leading brake shoes. This type of drum brake may further be classified into a drum brake of a single motion type (TP1W) and a drum brake of a dual motion type (TP2W). The TP1W drum brake produces a braking force at high gain in a forward direction of the rotation of the brake drum, but produces a braking force at less gain in a backward direction than in the forward direction. The TP2W drum brake produces a braking force at high gain in both the forward and backward directions.

The two leading drum brake is disadvantageous in that since two wheel cylinders are used, its manufacturing cost is high and the parking brake mechanism is complicated.

The duo servo drum brake has two brake shoes (a primary shoe and a secondary brake shoe) disposed opposite each other.

An upstream end of the primary brake shoe, which is located upstream when viewed in the forward direction of the rotation of the brake drum, is coupled to the wheel cylinder, while a downstream end of the primary brake shoe is coupled to the upstream end of the secondary brake shoe through, for example, an adjuster. The downstream end of the secondary brake shoe is in contact with an anchor portion fixedly mounted on a backing plate. The anchor portion receives braking reaction forces acting on the primary and secondary brake shoes.

The wheel cylinder presses the primary brake shoe and the secondary brake shoe against a circumferential inner surface of the brake drum. A braking reaction force acting on the primary brake shoe is applied to the upstream end of the secondary brake shoe to press the secondary brake shoe against the circumferential inner surface of the brake drum. Thus, the primary brake shoe and the secondary brake shoe both serve as leading shoes, and the drum brake produces a braking force at very high gain.

The duo servo drum brake is advantageous over the leading trailing drum brake and the two leading drum brake in the following aspects. The duo servo drum brake is capable of producing a fairly high braking effect, and allows for a reduction in the size of the drum brake. Further, it is easy to incorporate the parking brake into the duo servo drum brake.

However, the duo servo drum brake is sensitive to variations in friction coefficients of linings of the brake shoes and a variation of the contact state of the brake drum and the shoes. Therefore, its braking characteristics are unstable.

The leading trailing drum brake is more stable in its braking characteristics, and assembly of the parking brake into the leading trailing drum brake is easy compared to the duo servo drum brake and the two leading drum brake. However, the leading trailing drum brake produces a smaller braking effect. To increase the braking effect, it is necessary to increase the size of a booster of a master cylinder and the diameter of the brake drum. However, this makes it difficult to reduce the size of the drum brake.

As described above, each type of drum brakes have their advantages and disadvantages, and the brakes are selected in accordance with desired vehicle performance, use purposes, production scale, etc.

Automobiles have improved remarkably in their performance over the years. With these improvements, an increase in the braking effect is a key subject in the technical development in this field.

One approach to the problem of low stability of the braking effect of the duo servo drum brake includes controlling the operation of the wheel cylinder by utilizing the anchor reaction force from one of the brake shoes. A control piston is used to open and close a valve that controls a supply of a hydraulic pressure from the master cylinder. The control piston is displaced by the anchor reaction force. This approach has some problems, however. If the anchor reaction force fluctuates and the frequency of the opening and closing of the valve becomes high, the valve is worn out or damaged. If a difference in the hydraulic pressure between the master cylinder and a pressure chamber of the wheel cylinder is large at the time of the opening and closing of the valve, a hydraulic pressure oscillation grows large, and operation of the wheel cylinder becomes unstable. If a complicated structure of the wheel cylinder is used to control wheel cylinder operation in response to the anchor reaction force, the size of the wheel cylinder is increased. The wheel cylinder size increase leads to an increase of the overall size and weight of the drum brake, and to an increase in the cost of manufacturing the wheel cylinder and the drum brake.

In a structure where the anchor reaction force acting on the cylinder body of the wheel cylinder is used to control the wheel cylinder operation, the wheel cylinder body must be constructed of a rigid and expensive material. This also increases the size of the wheel cylinder and the manufacturing cost. As described above, the drum brake is equipped with the anchor portion that receives the anchor reaction force from the brake shoe at the time of braking.

In a conventional anchor portion, a pin that is in contact with the end of the brake shoe is raised on an anchor block.

The anchor block is fastened to the cylinder body of the wheel cylinder or to a backing plate. The pin is usually formed integrally with the anchor block by forging or cutting.

Thus, a part of the anchor portion that comes in contact with the end of the brake shoe is in a form of the pin. This avoids a situation where the end of the brake shoe is pressed against the anchor portion, when undesired forces, e.g., twisting, would act on the anchor portion.

A contact surface of the pin tends to wear out, and the pin is easily damaged or broken by its repetitive, strong contact with the end of the brake shoe. To prevent this, the contact surface of the pin that comes into contact with the brake shoe is smoothed by surface finishing or subjected to heat treatment in order to obtain a satisfactory hardness.

The conventional anchor portion has the construction of the pin and the anchor block as described above. Some problems arise from this construction, and some measures have been taken to solve these problems. The shape of the anchor block hinders precise machining and finishing of the pin. A machine used exclusively for the surface finishing of the pin is required. The heat treatment that applies high frequency radiation to the pin only takes a long time. To avoid this, the entire anchor block and the pin may be subjected to the heat treatment. However, the heat treatment then requires a large heat treating equipment. Thus, any of these measures entail an increase of the cost of manufacturing the drum brake.

In the case of the duo servo drum brake, two pins are required. Therefore, when the construction of the pin and the anchor block is employed, the result is an increase in size and complexity of the anchor portion, and the problems referred to above are even more conspicuous.

SUMMARY OF THE INVENTION

Accordingly, the present invention is directed to a drum brake that substantially obviates one or more of the problems due to the limitations and disadvantages of the related art.

One object of the present invention is to provide a drum brake where operation of a wheel cylinder may be controlled by an anchor reaction force from a brake shoe.

Another object of the present invention is to simplify the structure of the wheel cylinder and to reduce its size and weight.

Another object of the present invention is to provide a drum brake wherein the braking effect is stable, the depression of the brake pedal is easy, and the size and cost reduction of a brake system incorporating the drum brake is realized.

Another object of the present invention is to provide a drum brake which improves the durability of a valve for hydraulic pressure control.

Another object of the present invention is to provide a drum brake equipped with an anchor portion of high precision and quality, and manufacturable at low cost.

Another object of the present invention is to provide a drum brake of a duo servo type which stably produces a braking force irrespective of a direction of rotation of the brake drum.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

To achieve these and other advantages and in accordance with the purpose of the present invention, as embodied and broadly described, in accordance with a first aspect of the present invention there is provided a drum brake comprising:

a first brake shoe having a first end;

a second brake shoe having a first end and disposed opposite the first brake shoe within a brake drum;

a backing plate supporting the first and second brake shoes;

a pressure chamber;

a control piston for supplying a hydraulic pressure to the pressure chamber in response to a braking reaction force from the second brake shoe and movable to and from the second brake shoe;

a wheel cylinder disposed between the first end of the first brake shoe and the first end of the second brake shoe, the wheel cylinder including a drive piston for pressing the first and the second brake shoes against an inner surface of the brake drum when actuated by the hydraulic pressure from the pressure chamber, the drive piston having a base end in the pressure chamber and a leading end facing the first end of the first brake shoe, the drive piston being movable to and from the first brake shoe by the hydraulic pressure supplied to the pressure chamber;

an anchor portion for receiving an anchor reaction force from the second brake shoe; and a control lever for distributing the anchor reaction force to the anchor portion and to the control piston when the anchor reaction force reaches a predetermined braking force magnification, wherein the wheel cylinder further includes:

a control chamber behind the pressure chamber and defined by a cylinder wall of the wheel cylinder, the control chamber being pressurized by a hydraulic pressure from a master cylinder, wherein the control piston is aligned with the drive piston and has a base end of the control piston in the control chamber, while a leading end of the control piston faces the first end of the second brake shoe, and wherein the control piston cuts off a supply of the hydraulic pressure to the pressure chamber when the control piston is displaced into the control chamber by the anchor reaction force.

In another aspect of the present invention there is provided a drum brake including a first brake shoe having a first end, a second brake shoe having a first end and disposed opposite the first brake shoe on a backing plate within a brake drum, the first and second brake shoes adapted to press against the brake drum, a wheel cylinder disposed between the first end of the first brake shoe and the first end of the second brake shoe, a backing plate, an anchor portion fixedly mounted on the backing plate for receiving anchor reaction forces from the brake shoes, a control lever disposed between the first end of the second brake shoe and the anchor portion, and a master cylinder for providing hydraulic pressure, wherein the wheel cylinder includes a hydraulic pressure chamber, a drive piston having a base end received in a pressure chamber and a leading end facing the first end of the first brake shoe, the drive piston being movable to and from the first brake shoe by a hydraulic pressure in the pressure chamber, a control chamber behind the pressure chamber and defined by a cylinder wall of the wheel cylinder, the control chamber receiving the hydraulic pressure from the master cylinder, a control piston aligned with the drive piston and having a base end of the control piston in the control chamber and a leading end dynamically engaging a control lever, wherein the control piston is displaced towards the control chamber by the anchor reaction force to control the hydraulic pressure in the pressure chamber, a first hydraulic fluid passage extending from an inside bottom of a cylindrical part of the control piston to a circumferential outer surface of the control piston, wherein the cylindrical part is located closer to the control chamber, a second hydraulic fluid passage passing through the cylinder wall and connecting the first hydraulic fluid passage to the control chamber, a valve seat block biased away from the inside bottom of the cylindrical part by a damper spring, wherein the damper spring is slidably placed within the cylindrical part and has an end on an inside bottom of the cylindrical part, and a valve placed within the control chamber and elastically supported by a valve spring having an end on a bottom wall of the control chamber, wherein the valve contacts on the valve seat block and closes the first hydraulic fluid passage when the control piston is displaced towards the control chamber and past a predetermined point.

In another aspect of the present invention there is provided a drum brake including a first brake shoe having a first end, a second brake shoe having a first end and disposed opposite the first brake shoe within a brake drum and movable to and from an inner surface of the brake drum, a wheel cylinder disposed between the first end of the first brake shoe and the first end of the second brake shoe, an anchor portion for receiving anchor reaction forces, the anchor portion including first and second cylindrical anchor pins in contact with the first ends of the first and second brake shoes, the anchor portion further including an anchor block mounted on a backing plate for supporting the first and second brake shoes, wherein the first and second anchor pins are inserted into holes formed in the anchor block, and first and second contact walls formed on both sides of the anchor block such that the first contact wall supports the first anchor pin on a side opposite the first end of the first brake shoe, and the second contact wall supports the second anchor pin on a side opposite the first end of the second brake shoe.

In another aspect of the present invention there is provided a duo servo drum brake including a primary brake shoe disposed to press against a brake drum, a secondary brake shoe disposed opposite the primary brake shoe within the brake drum, wherein the secondary brake shoe presses against the brake drum due to braking reaction force acting on the primary brake shoe, and wherein a braking reaction force from the secondary brake shoe is received by an anchor located downstream of the secondary brake shoe, a wheel cylinder, a controller for controlling operation of the wheel cylinder, a first anchor pin downstream of the secondary brake shoe, a first rotatable control bar supported by the first anchor pin for receiving a braking force acting on the first anchor pin from the secondary brake shoe at a base end of the first rotatable control bar when the brake drum rotates in a forward direction, a second anchor pin upstream of the primary brake shoe, and a second rotatable control bar supported by the second anchor pin for receiving a braking force acting on the second anchor pin from the primary brake shoe at a base end of the second rotatable control bar when the brake drum rotates in a backward direction, wherein the first and the second rotatable control bars operate the controller to control a pressing force pressing the primary brake shoe and the secondary brake shoe against the brake drum.

In another aspect of the present invention there is provided a drum brake including a brake drum, a backing plate, a first brake shoe having a first end and disposed within the brake drum while being supported by the backing plate, a second brake shoe having a first end, and disposed within the brake drum opposite the first brake shoe while being supported by the backing plate, a wheel cylinder disposed within the brake drum, a pressure chamber and a control chamber within the wheel cylinder, a piston rod abutting the first brake shoe, a drive piston slidably arranged within the pressure chamber and having a base end within the pressure chamber and a leading end coupled to a the piston rod, an anchor portion for receiving an anchor reaction force, a control lever engaging the second brake shoe and the anchor portion, a control piston slidably arranged within the control chamber, axially aligned with the drive piston and having a base end within the control chamber and a leading end abutting the control lever, wherein the control piston cuts off a supply of hydraulic pressure to the pressure chamber when the control piston is displaced into the control chamber by the anchor reaction force.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 9 is an enlarged, perspective view showing an anchor portion of the drum brake of FIG. 7;

FIG. 10B shows a valve of the wheel cylinder of FIG. 10;

DETAILED DESCRIPTION OF THE PREFERRED EMBODIMENTS

Reference will now be made in detail to the preferred embodiments of the present invention, examples of which are illustrated in the accompanying drawings.

Figure 1:
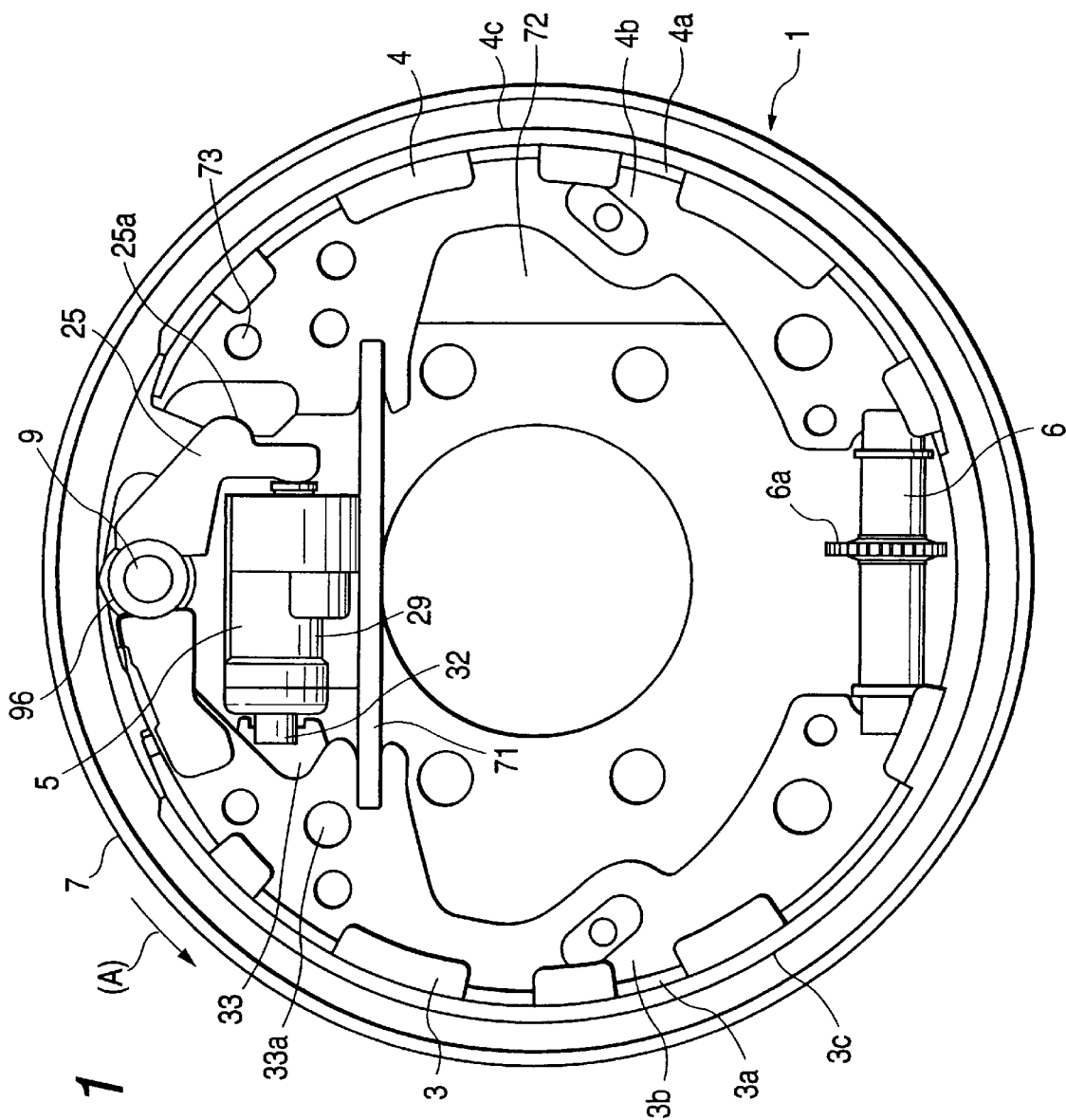
FIG. 1 is a front view showing a drum brake of a first embodiment of the present invention.
Figure 2:
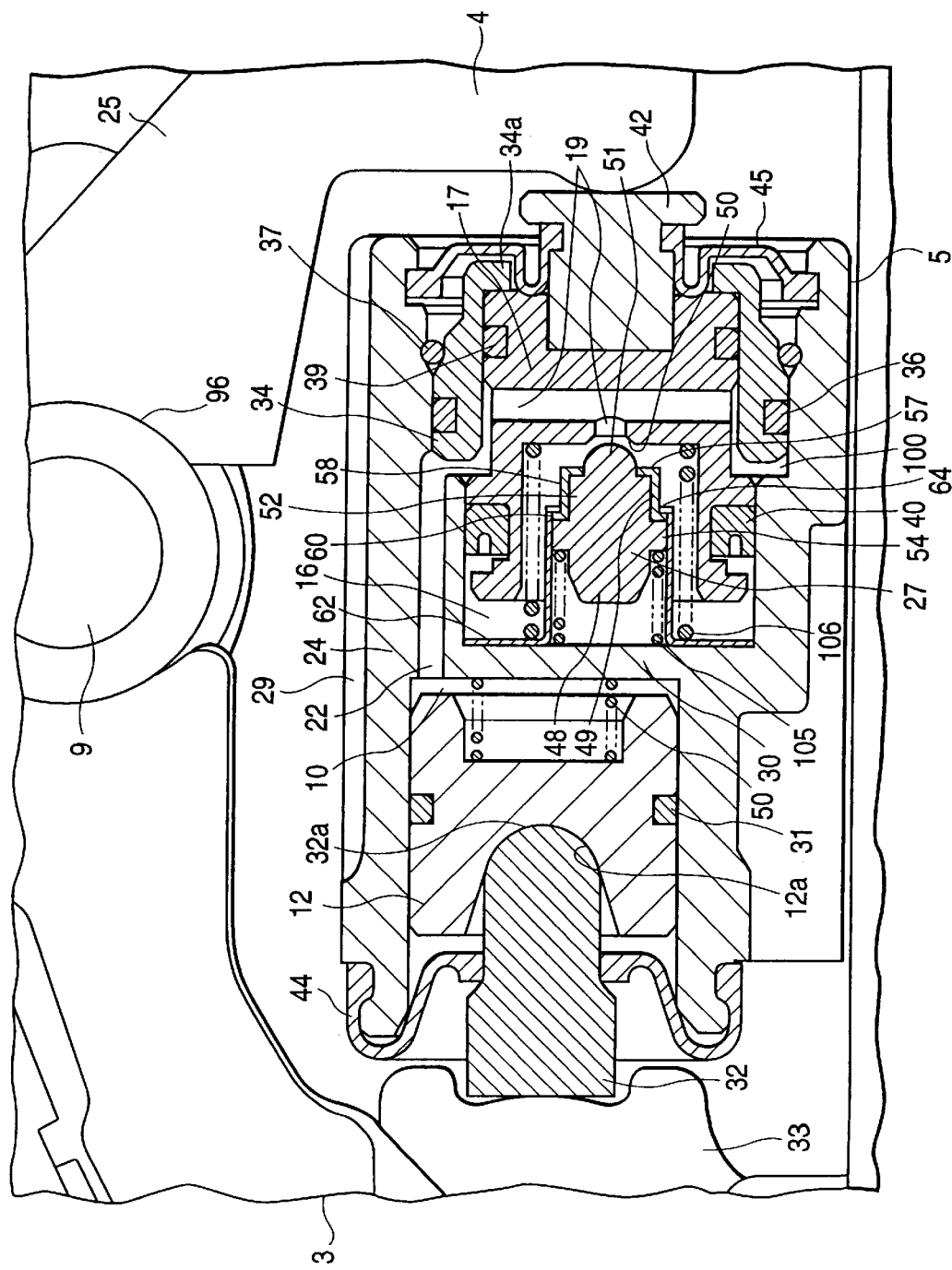
FIG. 2 is an enlarged, longitudinal sectional view showing a wheel cylinder of the drum brake of FIG. 1.
Figure 3A:
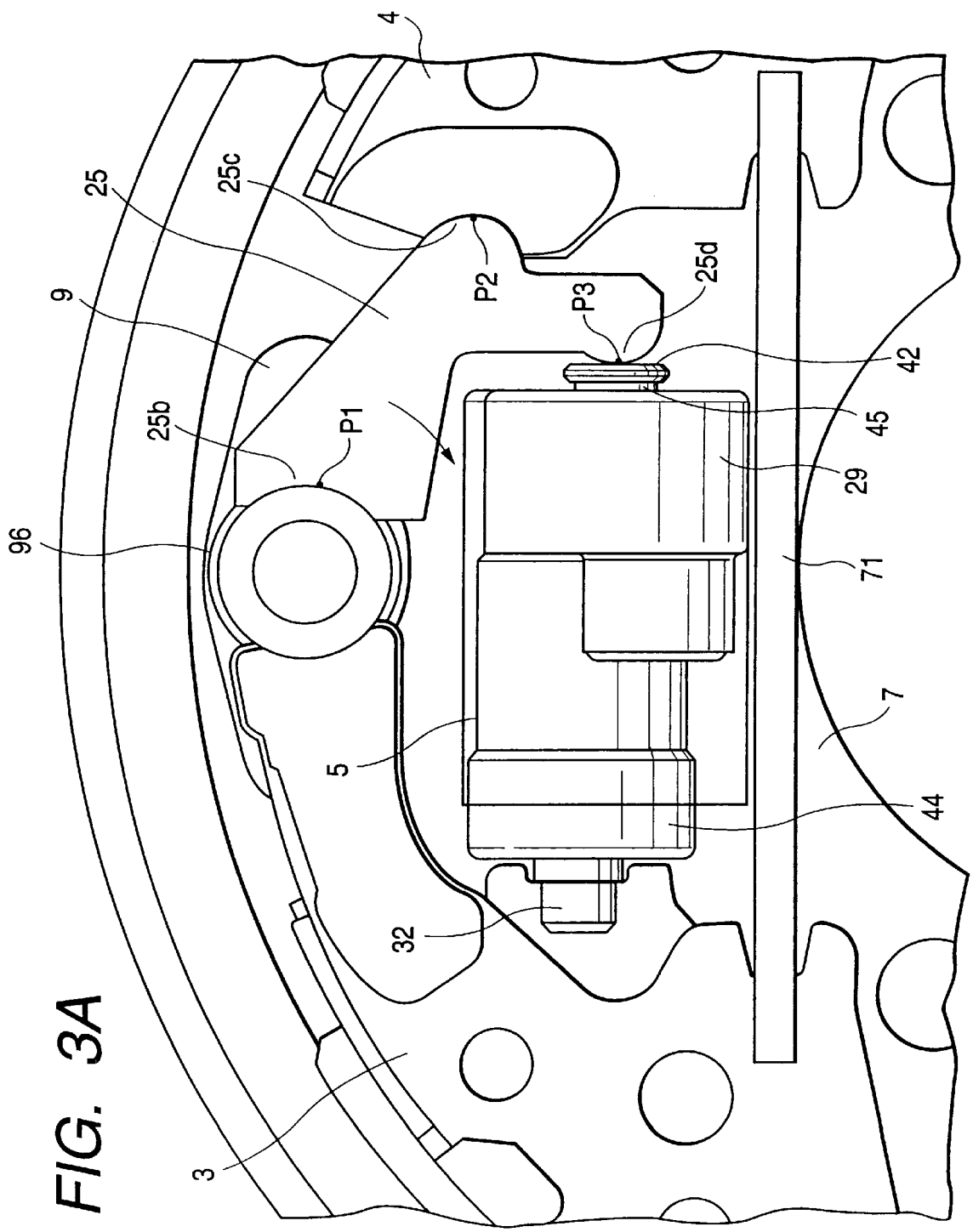
FIG. 3A is an enlarged view showing the wheel cylinder of the drum brake of FIG. 1 and its surrounding structure.
Figure 3B:
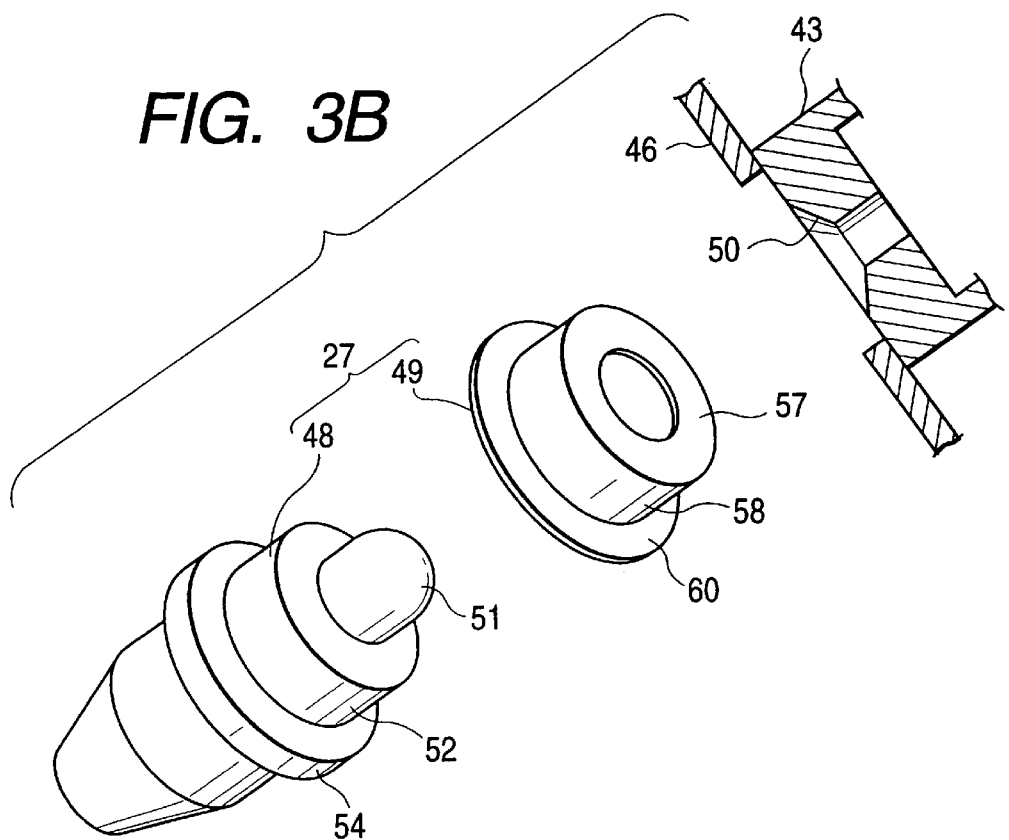
FIG. 3B shows a valve of the wheel cylinder of FIG. 2 and its surrounding structure.

FIGS. 1 through 3B show a first embodiment of the present invention. FIG. 1 is a front view showing the drum brake, FIG. 2 is an enlarged, longitudinal sectional view showing a wheel cylinder of the drum brake of FIG. 1, FIG. 3A is an enlarged view showing the wheel cylinder and its surrounding structure, and FIG. 3B shows a valve of the wheel cylinder of FIG. 2.

A drum brake 1, which is a duo servo type drum brake, includes a primary brake shoe 3 and a secondary brake shoe 4, which are oppositely disposed within a cylindrical brake drum. A wheel cylinder 5 is disposed at a location close to and below (when viewed in FIG. 1) first ends of the primary and secondary brake shoes 3 and 4 and expands the primary and secondary brake shoes 3 and 4. An adjuster 6 is disposed between second ends of the primary and secondary brake shoes 3 and 4 and transfers an output force of the primary brake shoe 3 to the secondary brake shoe 4. A backing plate 7 supports the above elements. An anchor portion 9 is disposed between the first ends of the primary and secondary brake shoes 3 and 4. The anchor portion 9 includes a pin 96 in contact with the first ends of the primary and secondary brake shoes 3 and 4. The pin 96 receives an anchor reaction force from the primary and secondary brake shoes 3 and 4.

The primary brake shoe 3 includes a rim 3a shaped like an arcuate plate and extending along the peripheral inner surface of the brake drum, a web 3b expanded to an inner side, and a lining 3c bonded over a peripheral outer surface of the web 3b. Similarly, the secondary brake shoe 4 includes a rim 4a, a web 4b and a lining 4c. The primary and secondary brake shoes 3 and 4 are mounted on the backing plate 7 such that the shoes 3 and 4 may press against and retract from the circumferential inner surface of the brake drum.

Opposed ends (first ends and second ends) of the primary and secondary brake shoes 3 and 4 on the backing plate 7 are urged towards each other (i.e. to move away from the inner surface of the brake drum) by return springs (not shown).

A strut 71 and a parking lever 72, which form a parking brake, are also assembled into the backing plate 7. The parking lever 72 may be turned about a parking lever pin 73. The primary and secondary brake shoes 3 and 4 may also be pressed against circumferential inner surface of the brake drum by the parking lever 72.

The adjuster 6 adjusts a gap between the second ends of the brake shoes 3 and 4 to compensate for a variation of the gap, which results from wear of the linings 3c and 4c. Specifically, the gap between the second ends of the primary and secondary brake shoes 3 and 4 is automatically adjusted by an adjuster lever (not shown) whose tips are brought into contact with the adjusting gear 6a by springs (not shown).

The anchor portion 9, which is separate from the wheel cylinder 5, is mounted on the backing plate 7 and is offset from the wheel cylinder 5. The anchor portion 9 includes the pin 96 whose orientation is coincident with an axial direction of the brake drum. A circumferential outer surface of the pin 96 serves as a contact surface for receiving an anchor reaction force.

The pin 96 is a single separate part. One side of the outer surface of the pin 96 directly contacts the first end of the primary brake shoe 3, while the other side directly contacts a contact surface of a control lever 25, which has a contact surface 25a that is convex and is in contact with the first end of the secondary brake shoe 4.

When a vehicle incorporating the drum brake 1 moves forward, the direction of rotation of the brake drum is indicated by an arrow A in FIG. 1. When the drum brake 1 is engaged during the forward movement of the vehicle, the pin 96 receives the anchor reaction force from the secondary brake shoe 4 through the control lever 25. When the drum brake 1 is engaged during a backward movement of the vehicle, the pin 96 receives the anchor reaction force directly from the primary brake shoe 3.

The first end of the primary brake shoe 3 has a concave contact surface in contact with the pin 96. A diameter of a circle defining the concave contact surface of the primary brake shoe 3 is slightly larger than that of the outer surface of the pin 96. The control lever 25 has the convex contact surface 25a in contact with the first end of the secondary brake shoe 4. A diameter of a circle defining the concave contact surface of the first end of the secondary brake shoe 4 is slightly larger than that of a circle defining the convex contact surface 25a of the control lever 25.

The present invention improves the wheel cylinder 5 in order to remove a defect of the conventional drum brake of the duo servo type that causes an instability in a braking effect.

As shown in FIG. 2, the wheel cylinder 5 includes a drive piston 12, a control chamber 16, a control piston 17, a connection passage 24, a valve 27, and a cylinder body 29. The piston 12 is disposed such that a base end of the drive piston 12 is in a pressure chamber 10, while a leading end of the drive piston 12 faces the end portion of the primary brake shoe 3. A hydraulic pressure applied to the pressure chamber 10 drives the drive piston 12, displacing it towards the primary brake shoe 3. When the hydraulic pressure is reduced or removed, the drive piston 12 retracts. The control chamber 16 is partially defined by a cylinder wall 30 of the cylinder body 29, and receives a hydraulic pressure from the master cylinder. The master cylinder generates the hydraulic pressure in response to a braking operation. The control piston 17 is aligned with the drive piston 12. A base end of the control piston 17 is in the control chamber 16, while a leading end of the control piston 17 faces the first end of the secondary brake shoe 4. The control piston 17 is movable to and from the secondary brake shoe 4. The connection passage 24 interconnects the pressure chamber 10 and the control chamber 16 through a hydraulic fluid passage 19 formed in the control piston 17 and through a hydraulic fluid passage 22 formed in the cylinder wall 30. The valve 27 is placed in the control chamber 16, and opens and closes the hydraulic fluid passage 19. The cylinder body 29 slidably supports the drive piston 12 and the control piston 17, and encloses the pressure chamber 10 and the control chamber 16.

The drive piston 12 is tightly and slidably held by the cylinder body 29 with the aid of a seal 31 that fits into a sealing groove formed around a peripheral outer surface of the drive piston 12. The drive piston 12 is biased towards the primary brake shoe 3 by a prestressed spring 50 (e.g., a compression coiled spring), which is press lit into the pressure chamber 10.

The leading end of the drive piston 12 engages the first end of the primary brake shoe 3 such that a piston rod 32 and an input lever 33 are placed there between. The leading end of the drive piston 12 includes a concave face 12a, which rotatively comes in contact with a convex face 32a of the piston rod 32. Thus, the drive piston 12 is coupled to the piston rod 32 in a spherical-surface contact manner. With such spherical surface contact, there is no twisting force acting on the drive piston 12 during the braking operation.

The leading end portion of the control piston 17 is slidably inserted into a sleeve 34. The sleeve 34 fits into the cylinder body 29. A ring-like seal 36, which fits into a sealing groove formed around the sleeve 34, tightly seals a space between the sleeve 34 and the cylinder body 29. A stopping ring 37, placed around the cylinder body 29, prevents the sleeve 34 from moving towards the secondary brake shoe 4. The control piston 17 abuts against a reduced-diameter portion 34a of an end of the sleeve 34, so that no further displacement of the control piston 17 towards the secondary brake shoe 4 is allowed.

A ring-like seal 39 around the leading end portion of the control piston 17 tightly seals a space between the control piston 17 and the sleeve 34. A ring-like seal 40 around the outer surface of the base end of the control piston 17 tightly seals a space between the cylinder wall 30 and the control piston 17.

The ring-like seal 40 prevents a clearance around the control piston 17 from permitting pressure communication between the control chamber 16 and the connection passage 24. The ring-like seal 40 serves as a check valve and operates as follows: when hydraulic pressure in the pressure chamber 10 increases above a predetermined level, the increased hydraulic pressure elastically deforms a lip of the ring-like seal 40 around the control piston 17, allowing the brake fluid to return from the pressure chamber 10 to the control chamber 16.

When the pressure chamber 10 is tightly closed by the control piston 17, i.e., in a hydraulic pressure holding state, if the hydraulic pressure within the pressure chamber 10 rises due to fluctuation of the brake drum, and the force applied to the primary brake shoe 3 by the drive piston 12 increases, the braking effect also increases. A so-called braking effect fluctuation occurs.

In this case, the wheel cylinder 5 operates as follows: when the hydraulic fluid passage 22 is closed by the valve 27, and the pressure chamber 10 is tightly closed and is in a pressure holding state, the hydraulic pressure within the pressure chamber 10 increases and exceeds the hydraulic pressure within the control chamber 16. The ring-like seal 40 relieves the brake fluid from the pressure chamber 10 into the control chamber 16, suppressing the hydraulic pressure increase within the pressure chamber 10 and suppressing the braking effect fluctuation.

If the hydraulic pressure within the pressure chamber 10 rises when the pressure chamber 10 is tightly closed and is in a pressure holding state, the wheel cylinder 5 operates in the following manner: the braking force on the primary brake shoe 3 due to the drive piston 12 increases; the pressing force acting on the control piston 17 through the control lever 25 increases; the control piston 17 is displaced further towards the control chamber 16; a volume of an auxiliary fluid chamber 100 that is connected to the pressure chamber 10 is increased; the increase of the volume of the auxiliary fluid chamber 100 entails a substantial increase in the hydraulic pressure in the pressure chamber 10; the increase of the hydraulic pressure in the pressure chamber 10 is suppressed; and the braking effect fluctuation is suppressed.

Thus, when the hydraulic pressure in the pressure chamber 10 rises due to a fluctuation of the brake drum, with the pressure chamber 10 in a pressure holding state, an increase of the hydraulic pressure is swiftly suppressed by the ring-like seal 40, and the response of the control piston 17 to the pressure increases, whereby a stable braking effect is obtained without the braking effect fluctuation.

Use of the wheel cylinder 5 as described above results in the following advantages. The braking effect is good and stable. The assembly of the parking brake is easy. The booster of the master cylinder is reduced in size. The braking system is reduced in size, and the cost to manufacture it is less.

If the brake pedal is released and the supply of the hydraulic pressure from the master cylinder to the control chamber 16 is cut off when the pressure chamber 10 is tightly closed by the control piston 17, i.e., in a hydraulic pressure holding state, the hydraulic pressure in the pressure chamber 10 is higher than that in the control chamber 16. Therefore, the ringlike seal 40 located in the clearance around the control piston 17 relieves the brake fluid from the pressure chamber 10 into the control chamber 16, so that the hydraulic pressure in the pressure chamber 10 decreases. Thus, if the braking operation ends and the hydraulic pressure in the pressure chamber 10 decreases, the hydraulic pressure in the clearance around the control piston 17 rapidly decreases through the action of the ring-like seal 40 even if the hydraulic fluid passage 22 is closed by the valve 27. Therefore, an additional supply of the brake fluid due to the increased hydraulic pressure caused by the drive piston 12 is rapidly removed.

The function of supplying and relieving the brake fluid to and from the pressure chamber 10 during the braking operation is shared by the valve 27 and the ring-like seal 40 that serves as a check valve. The valve 27 keeps the anchor reaction force at a predetermined braking force magnification by restricting the flow of the brake fluid into the pressure chamber 10 by closing the hydraulic fluid passage 22. The ring-like seal 40 drops the hydraulic pressure in the pressure chamber 10 in response to the hydraulic pressure in the master cylinder.

The advantages of the wheel cylinder 5 are as follows. The spring that biases the valve 27 against the hydraulic fluid passage 22 may have a large biasing force, since the biasing force of the spring may be selected so as to increase the sealing capability and stability when the hydraulic fluid passage 22 is closed, while neglecting the response of the wheel cylinder 5 when the hydraulic fluid passage 22 is opened. With the use of the spring having a large biasing force, tight contact of the valve 27 and the hydraulic fluid passage 22 is assured, and a closed state of the hydraulic fluid passage 22 is maintained in a more stable manner when the hydraulic fluid passage 22 is closed by the valve 27. Additionally, there is no need to use elastic material, e.g., rubber, for the valve 27, since the use of the spring with a large biasing force allows the valve 27 to contact the hydraulic fluid passage 22 more tightly.

In other words, the valve 27 may be made of a material of high mechanical strength, e.g., metal. Therefore, the wheel cylinder 5 has good sealing performance, satisfactory durability, and good operational reliability.

The control piston 17 is biased towards the secondary brake shoe 4 by a set spring 106 that is press fit into the control chamber 16. A piston rod 42 is fitted into the tip of the control piston 17.

A part of the control lever 25 located between the pin 96 and the first end of the secondary brake shoe 4 is brought into contact with the piston rod 42. Part of the anchor reaction force from the secondary brake shoe 4 is applied to the piston rod 42 through the control lever 25.

As shown in FIG. 3A, the control lever 25 includes a contact surface 25b for contacting the pin 96, a contact surface 25c for contacting the first end of the secondary brake shoe 4, and a convex contact surface 25d in contact with a flat end face of the piston rod 42.

The control lever 25 has contact points P1, P2, and P3. The control lever 25 turns about the contact point P1 where it contacts the pin 96 due to an anchor reaction force applied at a contact point P2, where the control lever 25 contacts the secondary brake shoe 4. The control lever 25 transmits the anchor reaction force at a contact point P3, where the control level 25 contacts the piston rod 42. The control lever 25 divides the anchor reaction force received from the secondary brake shoe 4 at a leverage defined by distances between the contact points P1, P2 and P3 to reduce the anchor reaction force transmitted to the piston rod 42.

Boots 44 and 45 are provided between the piston rod 32 and the cylinder body 29 and between the piston rod 42 and the cylinder body 29. The boots 44 and 45 block entry of foreign material into the cylinder body 29.

The valve 27 includes a one-piece molded solid body 48 made of rubber, for example, and a holder 49 made of metal and fitted to the solid body 48. The valve 27 functions as follows: when the anchor reaction force, which is transmitted from the secondary brake shoe 4 to the control piston 17 through the control lever 25 and the piston rod 42, exceeds the hydraulic pressure within the control chamber 16 (i.e., the hydraulic pressure within the master cylinder) and displaces the control piston 17 towards the valve 27, the valve 27 closes the hydraulic fluid passage 19 formed in the control piston 17.

The solid body 48 includes a valve head 51 and a cylindrical holding portion 52. The valve head 51 is substantially hemispherical and sits on a conical valve seat 50, which is formed at an opened end of the hydraulic fluid passage 19, and closes the hydraulic fluid passage 19. The cylindrical holding portion 52 is continuous to a base end of the valve head 51 and is larger in diameter than the valve head 51.

A collar 54 is formed around the cylindrical holding portion 52 at its center. The collar 54 receives the biasing force directed towards the hydraulic fluid passage 19.

The holder 49 includes an end-face cover 57, a tubular part 58, and a collar receiving part 60. The end-face cover 57 is shaped like a disc having an opening in its central portion, and is brought into surface contact with a step at a boundary between the valve head 51 and the cylindrical holding portion 52. The tubular part 58 extends from a circumferential outer edge of the end-face cover 57 and fits into the circumferential surface of the cylindrical holding portion 52. The collar receiving part 60 expands from a circumferential surface of the tubular part 58 while in contact with a circumferential side face of the collar 54.

The valve 27 is slidably held in the hydraulic fluid passage 19 by a guide tube 62, which is pressed against and fixed to an inside bottom of the control chamber 16 by the set spring 106, and further is biased towards the hydraulic fluid passage 19 by a valve spring (the compression coiled spring 105) placed in the guide tube 62.

The guide tube 62 includes a stop 64. The stop 64 defines a maximum extension position of the valve 27 when the collar receiving part 60 of the holder 49 comes in contact with the end face of the guide tube 62, which is closer to the hydraulic fluid passage 19.

When the drum brake 1 is in a non-braking mode, the pressure chamber 10 communicates with the control chamber 16.

When the drum brake 1 is in a braking mode, the hydraulic pressure is supplied from the master cylinder to the pressure chamber 10 through the control chamber 16; the drive piston 12 is displaced out of the pressure chamber 10 to push the first end of the primary brake shoe 3 against the brake drum; the brake shoes 3 and 4 press against the brake drum due to the motion of the drive piston 12 and the braking force is generated.

During the braking operation, the anchor reaction force depends on the braking effect, and is distributed at a predetermined ratio to the fixed anchor portion 9 and the control piston 17 through the control lever 25.

In the wheel cylinder 5, the drive piston 12 and the control piston 17 are aligned with each other co-axially so as to be displaced along the same axial line. Therefore, compared to a wheel cylinder having these pistons arranged in parallel fashion, the wheel cylinder 5 has a smaller diameter. Formation of the hydraulic fluid passage 22 for communicating between the pressure chamber 10 and the control chamber 16 is also easy.

When the drum brake 1 is operated, and the anchor reaction force from the secondary brake shoe 4 reaches a predetermined braking force magnification (i.e., the braking effect reaches a predetermined magnification), the control piston 17 is displaced towards the control chamber 16 by the anchor reaction force applied to the control piston 17 through the control lever 25 from the first end of the secondary brake shoe 4. As a result of the displacement of the control piston 17, the hydraulic fluid passage 19 is closed by the valve 27, cutting off the supply of the hydraulic pressure from the control chamber 16 to the pressure chamber 10. Due to the action of the control piston 17, the hydraulic pressure is kept at a fixed level within the pressure chamber 10.

During the braking operation, when the supply of the hydraulic pressure to the pressure chamber 10 is cut off by the control piston 17, if the braking effect decreases, the drum brake 1 operates as follows: the anchor reaction force, which is applied to the control piston 17 through the control lever 25, becomes smaller; the control piston 17 is displaced again in the forward direction (towards the control lever 25) by the hydraulic pressure supplied by the master cylinder; the valve 27 moves away from the conical valve seat 50 of the hydraulic fluid passage 19; and the supply of the hydraulic pressure from the control chamber 16 to the pressure chamber 10 starts again.

As described above, the control piston 17 controls the hydraulic pressure in the pressure chamber 10 in accordance with the anchor reaction force. Thus, the braking effect is stabilized so that the anchor reaction force is set at a fixed braking force magnification with respect to the hydraulic pressure received from the master cylinder. Therefore, the braking effect fluctuation is suppressed.

Figure 4:
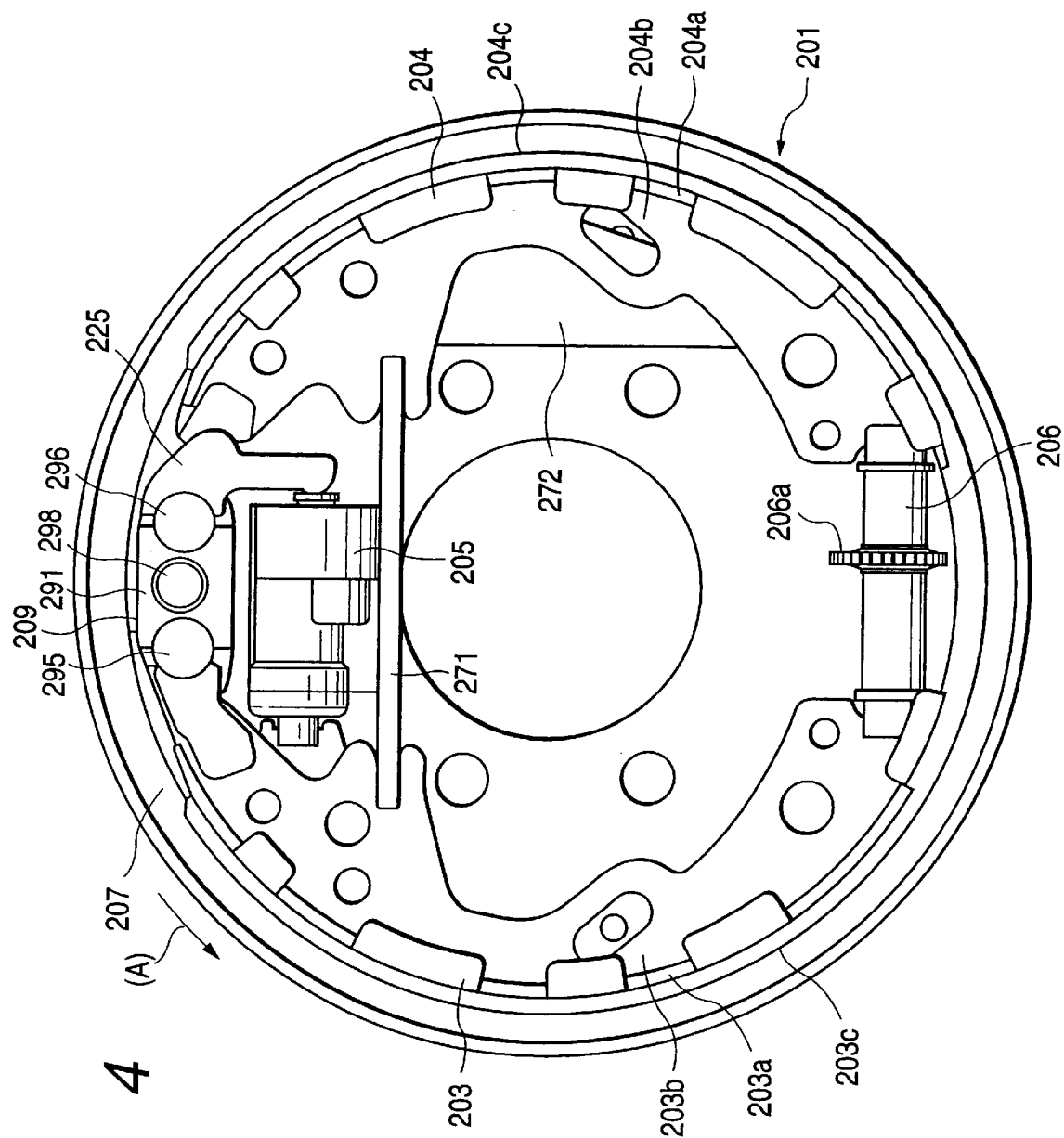
FIG. 4 is a front view showing a drum brake of a second embodiment of the present invention.
Figure 5:
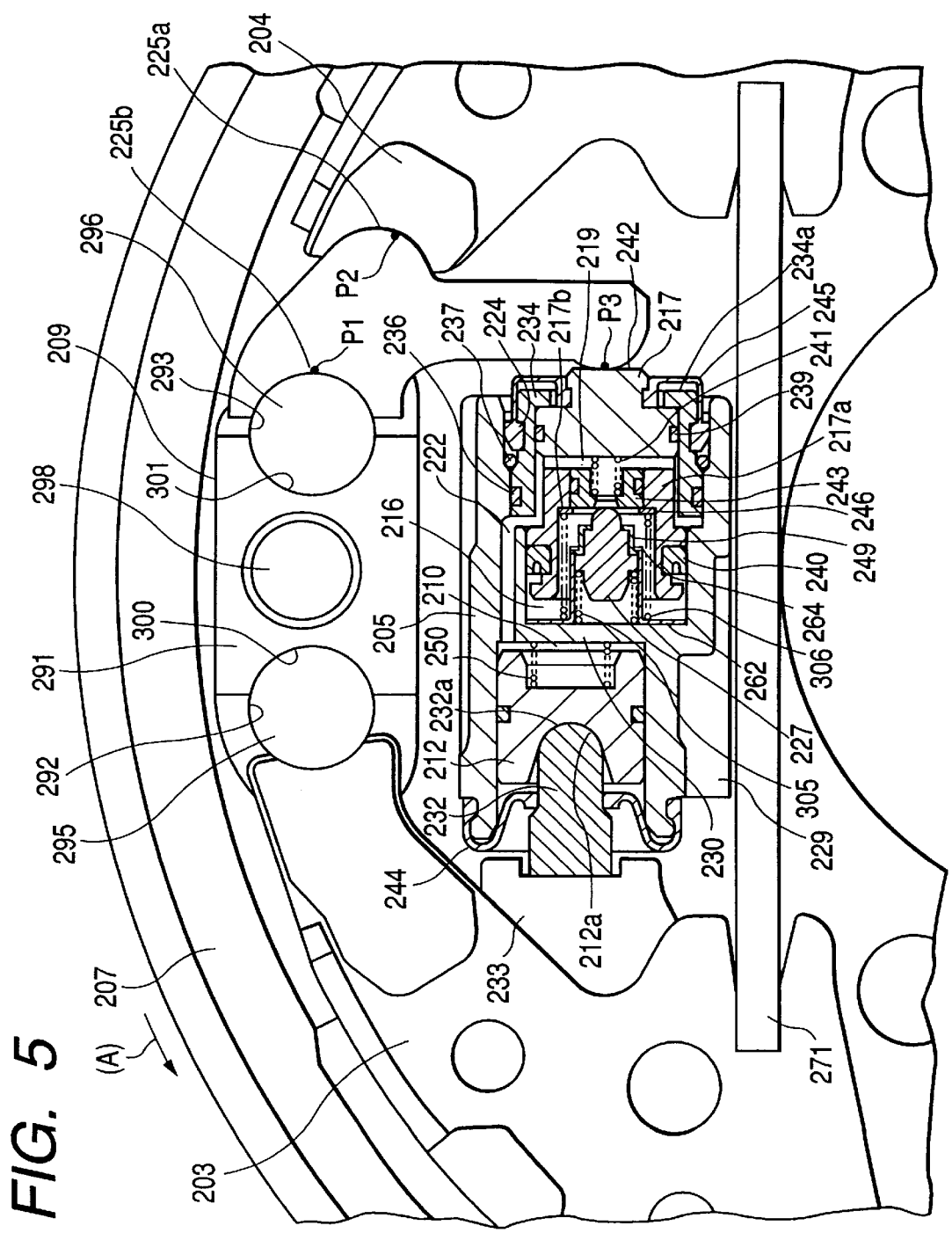
FIG. 5 is an enlarged, longitudinal sectional view showing a wheel cylinder of the drum brake of FIG. 4.
Figure 6:
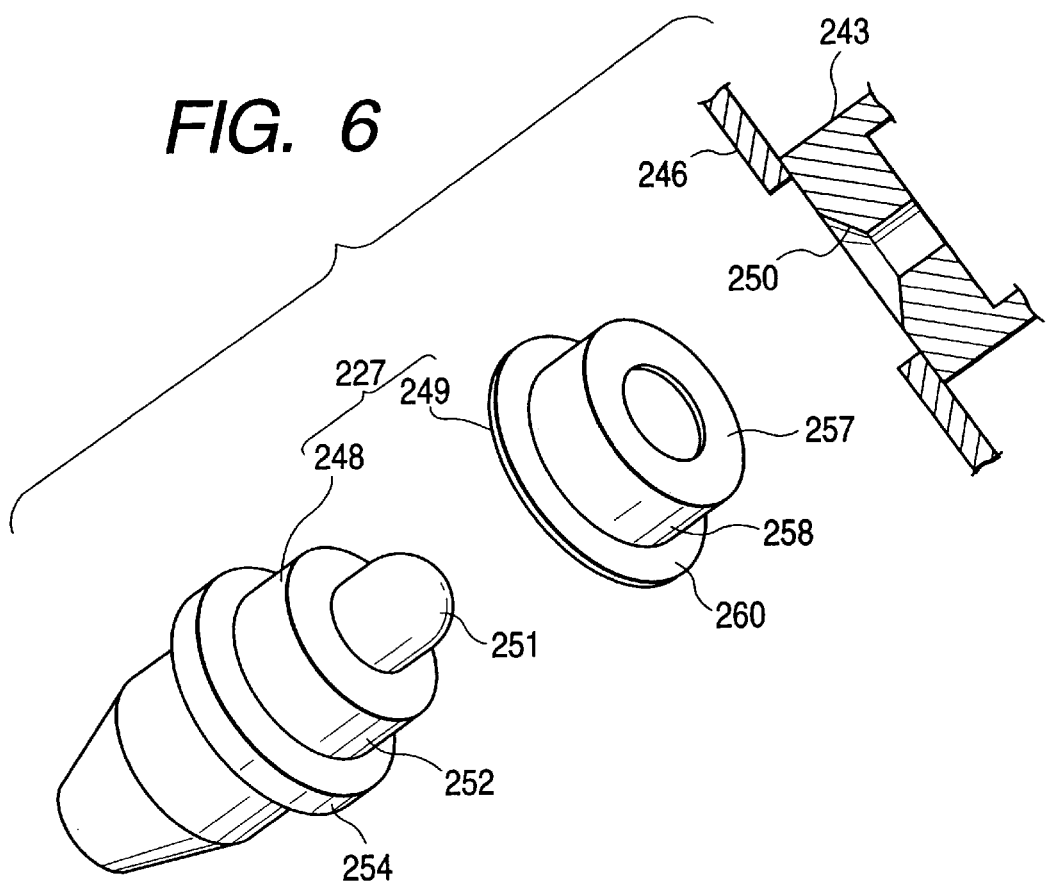
FIG. 6 is an enlarged view showing a valve of the wheel cylinder of FIG. 5 and its surrounding structure.

FIG. 4 is a front view showing a drum brake of a second embodiment of the present invention, FIG. 5 is an enlarged, longitudinal sectional view showing a wheel cylinder of the drum brake of FIG. 4, and FIG. 6 is an enlarged view showing a valve of the wheel cylinder of FIG. 5 and its surrounding structure.

As shown in FIGS. 4 and 5, an anchor portion 209 includes an anchor block 291 mounted on the backing plate 207, and anchor pins 295 and 296, which are both cylindrical in shape. The anchor pins 295 and 296 are inserted into holes 292 and 293 formed at both ends of the anchor block 291.

The anchor block 291 is formed by cutting or forging a metal block. A mounting hole is formed in a central portion of the anchor block 291 between the holes 292 and 293. A spring end 298 is inserted into the mounting hole, whereby the anchor block 291 is fixedly mounted on the backing plate 207.

A first end of a secondary brake shoe 204 is coupled to the anchor pin 296, which is located close to the secondary brake shoe 204, such that a control lever 225 is interposed there between. A first end of a primary brake shoe 203 is brought into direct contact with the anchor pin 295 located close to the primary brake shoe 203. Therefore, the anchor pin 296 receives an anchor reaction force from the secondary brake shoe 204 through the control lever 225 when a vehicle moves forward and a braking operation occurs. The anchor pin 295 receives an anchor reaction force from the primary brake shoe 203 when the vehicle moves backward and the braking operation occurs.

The anchor pins 295 and 296 are oriented in an axial direction of the brake drum. The anchor pins 295, 296 are press fit into the holes 292 and 293.

The first end of the primary brake shoe 203 has a concave contact surface in contact with the anchor pin 295. The diameter of a circle defining the contact surface is slightly larger than that of the anchor pin 295. The control lever 225 has a concave surface in contact with the anchor pin 295. The diameter of a circle defining the concave contact surface is slightly larger than that of the anchor pin 295. The contact surface 225a of the control lever 225 is convex and is in contact with the concave contact surface of the first end of the secondary brake shoe 204. The diameter of a circle defining the concave contact surface of the first end of the secondary brake shoe 204 is slightly larger than that of a circle defining the convex contact surface 225a of the control lever 225.

Contact walls 300 and 301, which are concave, are formed on both sides of the anchor block 291 (when viewed in FIG. 5). The contact wall 300 supports the anchor pin 295 such that a part of the surface of the anchor pin 295 opposite the contact wall 300 is in contact with the first end of the primary brake shoe 203. The contact wall 301 supports the anchor pin 296 in a similar fashion. The contact walls 300 and 301 are formed to have a middle portion of the anchor block 291 between the holes 292 and 293 raised to be shaped like a reversed T when viewed from a side and curved inward when viewed from the top.

A hydraulic fluid passage 219 extends from an inside bottom of a cylindrical part 217a of a control piston 217 to a circumferential outer surface of the control piston 217. The cylindrical part 217a is located closer to a control chamber 216. The hydraulic fluid passage 222 passes through the cylinder wall 230. The connection passage 224 interconnects the hydraulic fluid passage 219 and the hydraulic fluid passage 222 to allow for pressure communication between the control chamber 216 and the pressure chamber 210. The valve seat block 243 is biased by a damper spring 241 away from an inside bottom of the cylindrical part 217a. The damper spring 241 is slidably placed within the cylindrical part 217a and with its end on the inside bottom of the cylindrical part 217a. The valve 227 is placed within the control chamber 216 while being elastically supported by a valve spring 305, which is has its end on a bottom wall of the control chamber 216. When the control piston 217 is displaced towards the control chamber 216 and its displacement exceeds a predetermined amount, the valve 227 sits on the valve seat block 243. As a result, the hydraulic fluid passage 219 is closed to cut off pressure communication between the control chamber 216 and the pressure chamber 210.

The inside bottom of the cylindrical part 217a is reduced in diameter to form a stepped part 217b. Within the cylindrical part 217a, the valve seat block 243 is slidable to the diameter-reduced location thereof. When the valve seat block 243 comes into contact with a ring-like plate 246 in contact with the stepped part 217b, it is inhibited from further moving towards the control chamber 216.

The control piston 217 is biased towards the secondary brake shoe 204 by a set spring 306 inserted between the inside bottom of the control chamber 216 and a ring-like plate 246.

A piston rod 242 is attached to a tip of the control piston 217.

The piston rod 242 is brought into contact with a convex contact surface of one end of the control lever 225, which is placed between the anchor pin 296 and the first end of the secondary brake shoe 204. Part of the anchor reaction force from the secondary brake shoe 204 acts on the piston rod 242 through the control lever 225.

The control lever 225 has contract points P1, P2 and P3. The control lever 225 turns about the contact point P1 where it contacts the anchor pin 296 due to an anchor reaction force applied at a contact point P2, where the control lever 225 contacts the secondary brake shoe 204. The control lever 225 transmits the anchor reaction force through the contact point P3, where the control lever 225 contacts the piston rod 42. The control lever 225 divides the anchor reaction received from the secondary brake shoe 204 at a leverage defined by distances between the contact points P1, P2 and P3 to reduce the anchor reaction force transmitted to the piston rod 242.

The valve 227 is constructed of a one-piece molded solid body 248 made of rubber, for example, and a holder 249 made of metal and fitted to the solid body 248. The valve 227 functions as follows: when the anchor reaction force transmitted from the secondary brake shoe 204 to the control piston 217 through the control lever 225 and the piston rod 242 exceeds the hydraulic pressure within the control chamber 216 (i.e., the hydraulic pressure within the master cylinder) and the anchor reaction force displaces the control piston 217 towards the valve 227, the valve 227 sits on a valve seat block 243 housed in the control piston 217, and the valve 227 closes the hydraulic fluid passage 219.

The solid body 248, as shown in FIGS. 5 and 6, includes a valve head 251 and a holding portion 252. The valve head 251, which is substantially hemispherical, sits on a conical valve seat 250, which is formed in the valve seat block 243, and functions to close the hydraulic fluid passage 219. The holding portion 252, which is cylindrical, is continuous to a base end of the valve head 251 and is larger in diameter than the valve head 251.

The valve 227 is slidably held in the hydraulic fluid passage 219 by a guide tube 262, which is pressed against and fixed to the inside bottom of the control chamber 216 by the set spring 306 biasing the control piston 217, and further is biased towards the hydraulic fluid passage 219 by a valve spring (compression coiled spring 305) placed in the guide tube 262.

The guide tube 262 includes a stop 264. The stop 264 defines a maximum extension position of the valve 227 when the collar receiving part 260 comes in contact with the end face of the guide tube 262, which is closer to the hydraulic fluid passage 219.

When the drum brake 201 is in a non-braking mode, the pressure chamber 210 communicates with the control chamber 216 of the wheel cylinder 205.

When the drum brake 201 is in a braking mode, the hydraulic pressure is supplied from the master cylinder to the pressure chamber 210 through the control chamber 216, the hydraulic fluid passage 219, a connection passage 224 and a hydraulic fluid passage 222; the drive piston 212 is displaced out of the pressure chamber 210 to press the first end of the primary brake shoe 203 against the brake drum; due to the motion of the drive piston 212, the brake shoes 203 and 204 are expanded to press against the brake drum, whereby a braking force is generated.

When the control piston 217 is displaced towards the control chamber 216 by the received anchor reaction force, the valve 227 sits on the conical valve seat 250 of the valve seat block 243 to cut off pressure communication between the control chamber 216 and the pressure chamber 210, and to cut off the supply of the hydraulic pressure to the pressure chamber 210. Due to the actions of the control piston 217 and the valve 227, the hydraulic pressure within the pressure chamber 210 is kept at a fixed level.

During braking, when the supply of the hydraulic pressure to the pressure chamber 210 is cut off as a result of the displacement of the control piston 217 towards the control chamber 216, if the braking effect decreases, the drum brake 201 operates as follows: the anchor reaction force exerted on the control piston 217 through the control lever 225 decreases; the control piston 217 is displaced again in the forward direction (towards the control lever 225) by the hydraulic pressure supplied from the master cylinder; the valve 217 moves away from the valve seat block 243 to open the hydraulic fluid passage 219 and provide communication between the control chamber 216 and the pressure chamber 210; and the supply of the hydraulic pressure from the control chamber 216 to the pressure chamber 210 starts again.

During braking, when the supply of the hydraulic pressure to the pressure chamber 210 is cut off as a result of the displacement of the control piston 217 towards the control chamber 216, if the hydraulic pressure of the master cylinder rises (i.e., if the brake pedal is further depressed), the increase of the hydraulic pressure within the control chamber 216 pushes the control piston 217 back against the control lever 225. The valve 227 moves away from the valve seat block 243 to open the hydraulic fluid passage 219, allowing communication between the control chamber 216 and the pressure chamber 210. As a result, the supply of the hydraulic pressure from the control chamber 216 to the pressure chamber 210 is restored.

During braking, when the supply of the hydraulic pressure to the pressure chamber 210 is cut off as a result of the displacement of the control piston 217 towards the control chamber 216, if the braking effect (brake torque) increases, the anchor reaction force applied to the control piston 217 through the control lever 225 increases further, and the control piston 217 is further displaced towards the control lever 225 by the hydraulic pressure. The valve seat block 243, which is slidably positioned within the control piston 217, moves to the inside bottom of the cylindrical part 217a while carrying the valve 227 thereon.

The displacement of the valve seat block 243 pressurizes the brake fluid stagnating in the gap between the valve seat block 243 and the inside bottom of the cylindrical part 217a, and the brake fluid is moved towards the control chamber 216 through the sliding clearance between the control piston 217 and the control chamber 216. Therefore, the stroke of the control piston 217 is increased by a distance corresponding to the movement of the brake fluid caused by the displacement of the valve seat block 243. When an increase of the hydraulic pressure in the pressure chamber 210 is needed, the amount of the brake fluid is increased. The brake fluid can be supplied to the control chamber 216 by the valve 227 such that the valve 227 sits on the conical valve seat 250 of the valve seat block 243. Further, the opening and closing motions of the valve 227 are infrequent. The difference in hydraulic pressure between the pressure chamber 210 and the control chamber 216 is reduced when the hydraulic fluid passage 219 is opened by the valve 227. The result is to lessen the impact caused when the hydraulic fluid passage 219 is opened by the valve 227.

Figure 7:
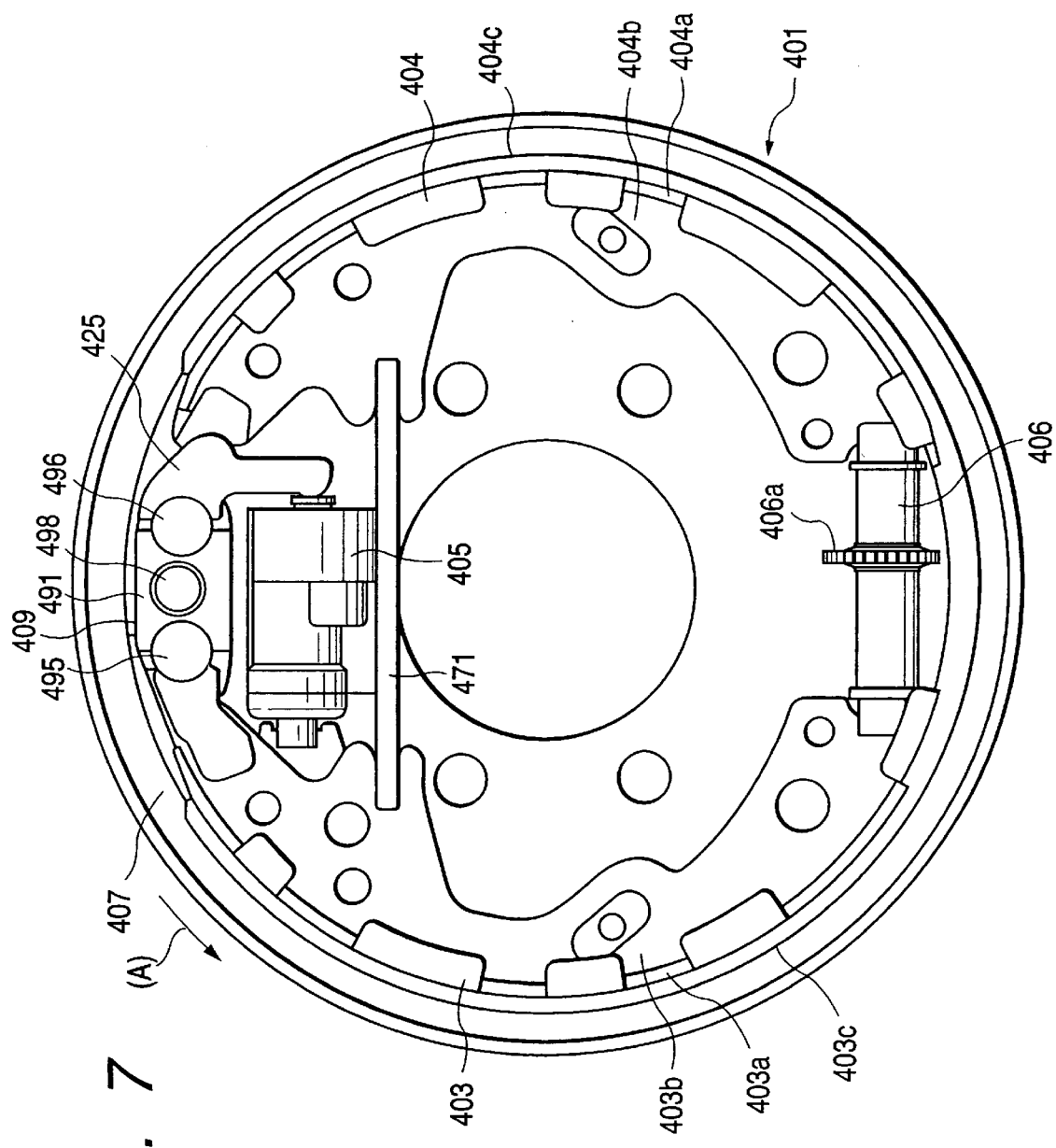
FIG. 7 is a front view showing a drum brake of a third embodiment of the present invention.
Figure 8:
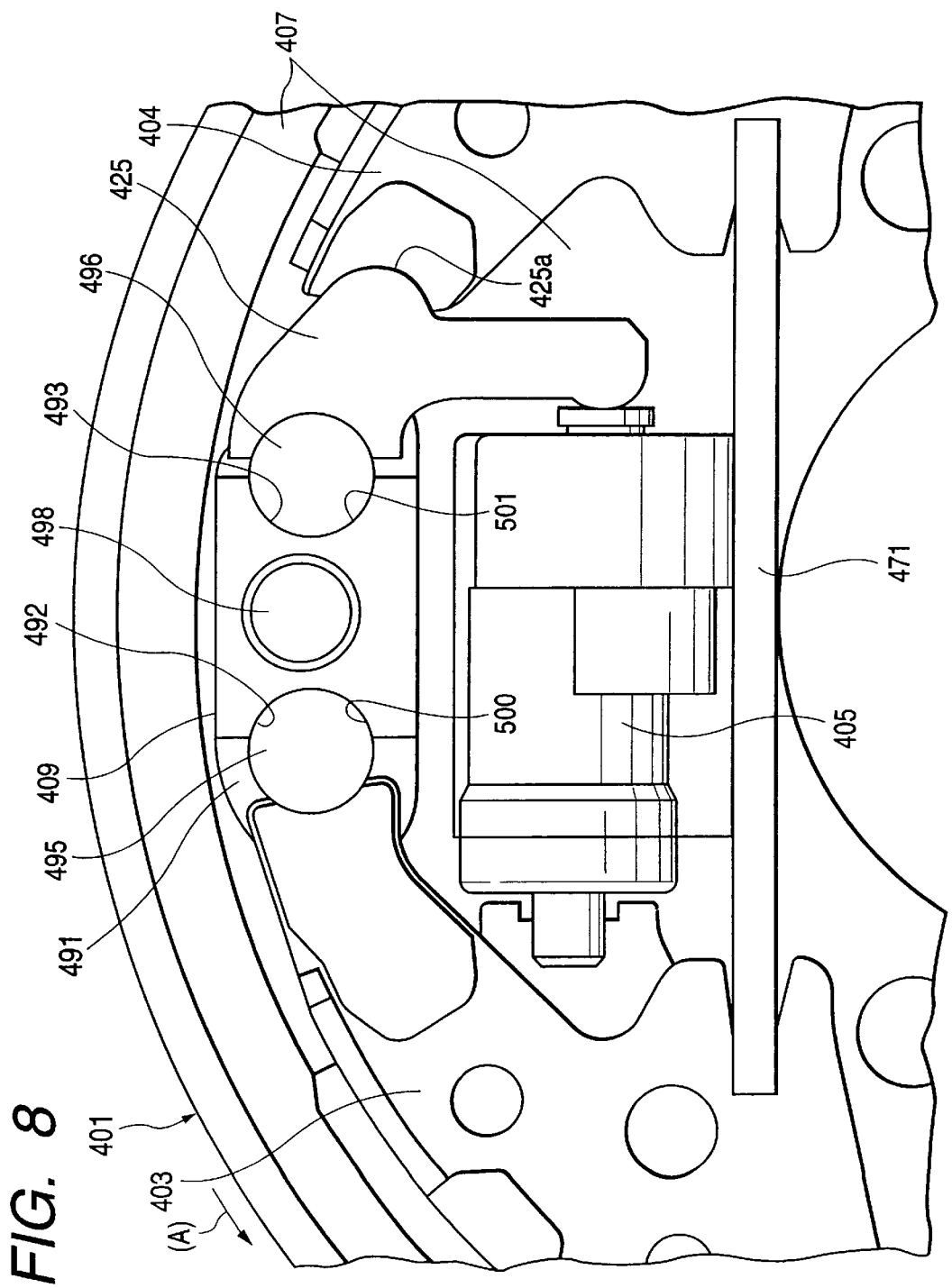
FIG. 8 is an enlarged view showing an anchor portion of the drum brake of FIG. 7.
Figure 10A:
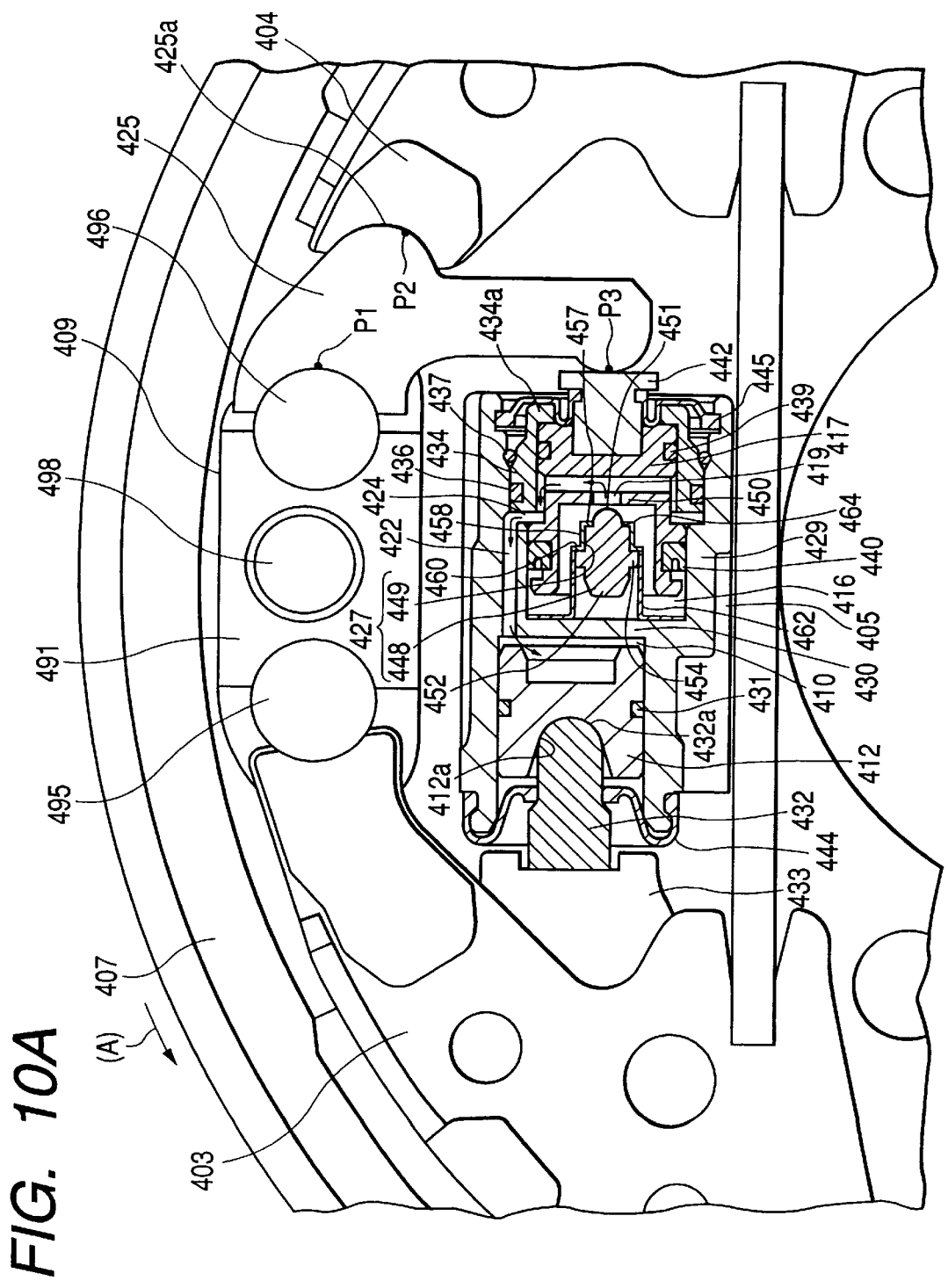
FIG. 10A is an longitudinal sectional view showing a wheel cylinder of the drum brake of FIG. 7.

FIGS. 7 through 10A show a drum brake of a third embodiment of the present invention. FIG. 7 is a front view showing the drum brake of the third embodiment of the present invention, FIG. 8 is an enlarged view showing an anchor portion of the drum brake, FIG. 9 is an enlarged, perspective view showing an anchor portion of the drum brake, FIG. 10A is a longitudinal sectional view showing a wheel cylinder used in the drum brake of FIG. 7, and FIG. 10B shows a valve of the wheel cylinder of FIG. 10A.

The drum brake 401, which is of a duo servo type, includes a pair of brake shoes, i.e., a primary brake shoe 403 and a secondary brake shoe 404, which are oppositely disposed within a cylindrical brake drum. A wheel cylinder 405 is disposed close to and below (when viewed in FIG. 7) first ends of the paired brake shoes and expands the brake shoes 403 and 404. An adjuster 406 is disposed between the second ends of the brake shoes 403 and 404 and functions to transfer an output force of the primary brake shoe 403 to the secondary brake shoe 404. A backing plate 407 supports these elements, and an anchor portion 409 is disposed between the first ends of the brake shoes 403 and 404. The anchor portion 409 includes anchor pins 496, 496 in contact with the first ends of the paired brake shoes 403 and 404, and receives anchor reaction forces from the brake shoes 403 and 404.

The primary brake shoe 403 includes a rim 403a shaped like an arcuate plate and extending along the peripheral inner surface of the brake drum, a web 403b expanded to the inner side, and a lining 403c bonded over a peripheral outer surface of the web 403b. Similarly, the secondary brake shoe 404 includes a rim 404a, a web 404b and a lining 404c. The brake shoes 403 and 404 are mounted on the backing plate 407 such that the brake shoes 403 and 404 may advance towards and retract from the circumferential inner surface of the brake drum.

Opposed ends (first ends and second ends) of the brake shoes 3 and 4 on the backing plate 407 are urged to approach to each other (move away from the drum inner surface) by return springs (not shown).

A strut 471 and a parking lever which form a parking brake, are also assembled into the backing plate 407. The brake shoes 403 and 404 may also be pressed against the brake drum surface by the parking lever.

The adjuster 406 adjusts the gap between the second ends of the brake shoes 403 and 404 to compensate for a variation of a gap, which results from a wear of the linings 403c and 404c. Specifically, the gap between the second ends of the brake shoes 403 and 404 is automatically adjusted by an adjuster lever (not shown) whose tips are brought into contact with an adjusting gear 406a by springs (not shown).

The anchor portion 409 includes an anchor block 491 mounted on the backing plate 407 and two anchor pins 495 and 496, which are shaped like cylindrical rods and are inserted into holes 492 and 493.

The anchor block 491 is formed by cutting or forging a metal block. A mounting hole is formed in a central portion of the anchor block 491, which is located between the holes 492 and 493. A spring end 498 is inserted into the mounting hole, whereby the anchor block 491 is fixedly mounted on the backing plate 407. The anchor pin 496, located near the secondary brake shoe 404, contacts a contact surface of the control lever 425, which has another convex contact surface 425a in contact with the first end of the secondary brake shoe 404. The anchor pin 495, located near the primary brake shoe 403, directly contacts the first end of the primary brake shoe 403.

When a vehicle incorporating the drum brake 401 moves forward, the direction of rotation of the brake drum is indicated by an arrow A in FIG. 7. When the drum brake 401 is operated during the forward movement of the vehicle, the anchor pin 496 receives an anchor reaction force from the secondary brake shoe 404 through the control lever 425. When the drum brake 401 is operated during the backward movement of the vehicle, the anchor pin 495 receives an anchor reaction force from the primary brake shoe 403.

The anchor pins 495 and 496 are oriented in the axial direction of the brake drum. The anchor pins 495 and 496 are press fit into the holes 492 and 493 to form a unit including the anchor block 491.

The first end of the primary brake shoe 403 has a concave contact surface in contact with the anchor pin 495. The diameter of a circle defining the concave contact surface is slightly larger than that of the anchor pin 495. The control lever 425 has a concave contact surface in contact with the anchor pin 496. The diameter of a circle defining the concave contact surface is slightly larger than that of the anchor pin 496. A contact surface 425a of the control lever 425 is convex and is in contact with the concave contact surface of the first end of the secondary brake shoe 404. The diameter of a circle defining the concave contact surface of the first end of the secondary brake shoe 404 is slightly larger than that of a circle defining the convex contact surface 425a of the control lever 425.

Contact walls 500 and 501, which are concave, are formed on both sides of the anchor block 491 (when viewed in FIG. 8). The contact wall 500 supports the anchor pin 495 on a part of the surface of the anchor pin 495 opposite the first end of the primary brake shoe 403. The contact wall 501 supports the anchor pin 496 in a similar fashion. The contact walls 500 and 501 are formed such that a middle portion of the anchor block 491 between the holes 492 and 493 is raised to be shaped like a reversed T when viewed from a side and curved inward when viewed from the top.

The present invention improves the wheel cylinder 405 in order to remove a defect of the conventional drum brake of the duo servo type that creates an unstable braking effect.

As shown in FIG. 10A, the wheel cylinder 405 includes a drive piston 412, a control chamber 416, a control piston 417, a connection passage 424, a valve 427, and a cylinder body 429. The drive piston 412 is disposed such that a base end of the drive piston 412 is in the pressure chamber 410, while its leading end faces the end portion of the primary brake shoe 403. A hydraulic pressure applied to the pressure chamber 410 displaces the drive piston 412 towards the primary brake shoe 403, and when the hydraulic pressure is reduced or removed, the drive piston 412 retracts. The control chamber 416 is partially defined by a cylinder wall 430 of a cylinder body 429, and receives a hydraulic pressure from a master cylinder. The master cylinder generates a hydraulic pressure in response to a braking operation. The control piston 417 is axially aligned with the drive piston 412. A base end of the control piston 417 is in the control chamber 416, while a leading end faces the end portion of the secondary brake shoe 404. The control piston 417 is movable to and from the secondary brake shoe 404. The connection passage 424 interconnects the pressure chamber 410 and the control chamber 416 through a hydraulic fluid passage 419 formed in the control piston 417 and the hydraulic fluid passage 422 formed in the cylinder wall 430. The valve 427 is placed in the control chamber 416, and opens and closes the hydraulic fluid passage 419. The cylinder body 429 slidably supports the drive piston 412 and the control piston 417, and forms the pressure chamber 410 and the control chamber 416.

The drive piston 412 is tightly and slidably held by the cylinder body 429 with the aid of a seal 431 fitted into a sealing groove formed around a peripheral outer surface of the drive piston 412. The drive piston 412 is biased towards the primary brake shoe 403 by a prestressed spring (e.g., a compression coiled spring), which is press fit into the pressure chamber 410. The leading end of the drive piston 412 engages the first end of the primary brake shoe 403 such that the piston rod 432 and an input lever 433 are placed therebetween. The leading end of the drive piston 412, which rotatively comes in contact with a convex surface 432a of the piston rod 432, is curved inward and complements the concave surface 412a. Thus, the drive piston 412 is coupled to the piston rod 432 in a spherical-surface contact manner. With such spherical-surface contact, twisting forces do not act on the drive piston 412 during the braking operation.

The leading end portion of the control piston 417 is slidably inserted into the sleeve 434. The sleeve 434 is fitted into the cylinder body 429. A ring-like seal 436, which is fitted into a sealing groove formed around the sleeve 434, tightly seals a space between the sleeve 434 and the cylinder body 429. A stopping ring 437 around the cylinder body 429 prevents the sleeve 434 from moving towards the secondary brake shoe 404. The control piston 417 abuts a reduced-diameter part 434a of an end of the sleeve 434, so that no further displacement of the control piston 417 towards the secondary brake shoe 404 is allowed.

A ring-like seal 439 around the leading end portion of the control piston 417 tightly seals a space between the control piston 417 and the sleeve 434. A ring-like seal 440 around the outer surface of the base end of the control piston 417 tightly seals a space between the cylinder wall 430 and the control piston 417. The ring-like seal 440 prevents a clearance around the control piston 417 from allowing the control chamber 416 to communicate with the connection passage 424. The ring-like seal 440 thus serves as a check valve, and operates as follows: when the hydraulic pressure in the pressure chamber 410 increases above a predetermined level, the increased hydraulic pressure removes the sealing around the control piston 417 and allows the brake fluid to return from the pressure chamber 410 to the control chamber 416.

The control piston 417 is biased towards the secondary brake shoe 404 by a spring (a compressing coiled spring) that is press fit into the control chamber 416. The piston rod 442 is fitted into a tip of the control piston 417.

A part of the control lever 425 located between the anchor pin 496 and the first end of the secondary brake shoe 404 is brought into contact with the piston rod 442. Part of the anchor reaction force from the secondary brake shoe 404 is applied to the piston rod 442 through the control lever 425.

The control lever 425 has contact points P1, P2 and P3. The control lever 425 turns about the contact point P1, where it contacts the anchor pin 496 due to the anchor reaction force applied to the contact point P2, where the control lever 425 contacts the secondary brake shoe 404. The control lever 425 transmits the anchor reaction force to a contact point P3, where the control lever 425 contacts the piston rod 442. The control lever 425 divides the anchor reaction force received from the secondary brake shoe 404 at a leverage defined by distances between the contact points P1, P2 and P3 to reduce the anchor reaction force transmitted to the piston rod 442.

Boots 444 and 445 are provided between the piston rod 432 and the cylinder body 429 and between the piston rod 442 and the cylinder body 429, respectively. The boots 444 and 445 block entry of foreign material into the cylinder body 429.

The valve 427 is constructed of a one-piece molded solid body 448 made of rubber, for example, and a holder 449 made of metal and fit to the solid body 448. The valve 427 functions as follows: when the anchor reaction force, which is transmitted from the secondary brake shoe 404 to the control piston 417 through the control lever 425 and the piston rod 442, exceeds a force exerted by the hydraulic pressure within the control chamber 416 and displaces the control piston 417 towards the valve 427, the valve 427 closes the hydraulic fluid passage 419 formed in the control piston 417.

The solid body 448 includes a valve head 451 and a holding portion 452. The valve head 451 is substantially hemispherical, sits on a conical valve seat 450, which is formed at the opened end of the hydraulic fluid passage 419, and opens and closes the hydraulic fluid passage 419. The holding portion 452 is cylindrical, continuous to a base end of the valve head 451, and is larger in diameter than the valve head 451.

A collar 454 is formed around the holding portion 452 at its center position. The collar 454 receives a biasing force directed towards the hydraulic fluid passage 419.

A holder 449 includes an end-face cover 457, a tubular part 458, and a collar receiving part 460. The end-face cover 457 is shaped like a disc having an opening at the central portion, and is brought into surface contact with a step at the boundary between the valve head 451 and the holding portion 452. The tubular part 458 extends from a circumferential outer edge of the end-face cover 457 and fits into the circumferential surface of the holding portion 452. The collar receiving part 460 expands from the circumferential surface of the tubular part 458 while in contact with the circumferential side face of the collar 454.

The valve 427 is slidably held against the hydraulic fluid passage 419 by a guide tube 462 (which is pressed against and fixed to the inside bottom of the control chamber 416) by the set spring (not shown) biasing the control piston 417, and further is biased towards the hydraulic fluid passage 419 by a valve spring (compression coiled spring) (not shown) placed in the guide tube 462.

The guide tube 462 includes a stop 464. The stop 464 defines the maximum extension position of the valve 427 when the collar receiving part 460 comes in contact with the end face of the guide tube 462, which is closer to the hydraulic fluid passage 419.

When the vehicle moves forward, the pressure chamber 410 operates as follows: when the anchor reaction force from the secondary brake shoe 404 reaches a predetermined braking force magnification with respect to an input hydraulic pressure from the master cylinder (i.e., with respect to the hydraulic fluid pressure in the control chamber 416), the control piston 417 is displaced towards the control chamber 416 by the anchor reaction force received by the leading end of the control piston 417 through the control lever 425 from the first end of the secondary brake shoe 404. As a result of the displacement of the control piston 417, the hydraulic fluid passage 419 is closed by the valve 427, and the hydraulic pressure is kept at a fixed level within the pressure chamber 410.

For this reason, the anchor reaction force, which is obtained by amplifying the input hydraulic pressure from the master cylinder by a predetermined magnification, is stable. In this respect, the drum brake 401 of the present invention solves the problem of the conventional duo servo drum brake, i.e., instability of the braking effect.

In the drum brake 401, the anchor block 491 and the anchor pins 495 and 496, which form the anchor portion 409, are separate component parts. Therefore, the anchor pins may be machined and finished separately from the anchor block 491.

The anchor pins 495 and 496 each have a simple cylindrical shape. The circumferences of outer surfaces of the anchor pins 495, 496 that are contact with the brake shoes 403, 404 may be finished easily and precisely without using a machine used exclusively for the surface finishing.

The anchor block 491 includes the contact walls 500 and 501. The contact walls 500 and 501 support the sides of the anchor pins 495 and 496 opposite the sides that are closer to the brake shoes 403 and 404. Therefore, the anchor reaction force acting on the anchor pins 495 and 496 can be efficiently transferred into the anchor block 491. If the anchor pins 495 and 496 are relatively small in diameter, they can endure a strong anchor reaction force. Thus, it is possible to reduce diameter of the anchor pins 495 and 496. Further, heat treatment may be applied only to a pin whose hardness must be in excess of a predetermined value since it is brought into contact with an end of a brake shoe.

In the drum brake 401 of the duo servo type, the anchor portion 409 of the double anchor type having two anchor pins 495, 496 may be manufactured relatively simply by merely forming two holes for receiving the anchor pins 495 and 496 in the anchor block 491.

In the first, second and third embodiments, the anchor portion for receiving the anchor reaction force is formed of three separate component parts: the anchor pins in contact with the ends of the brake shoes, and the anchor block for receiving the anchor pins. The same approach may be applied to an anchor portion of a single anchor type brake having a single anchor pin.

A duo servo drum brake of a fourth embodiment of the present invention will be described with reference to FIGS. 11 through 16.

Figure 11:
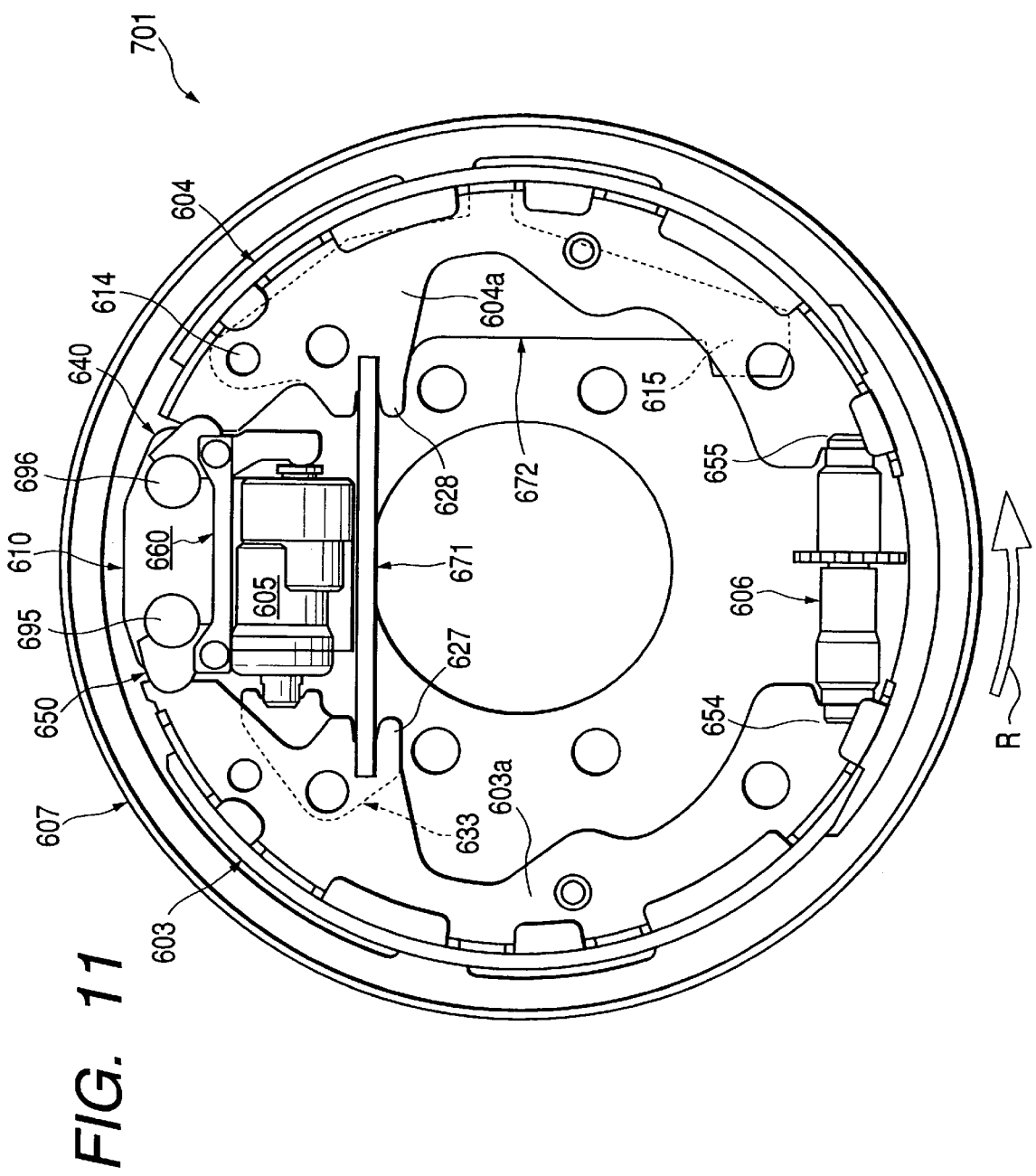
FIG. 11 is a front view showing a duo servo drum brake of a fourth embodiment of the present invention.
Figure 12:
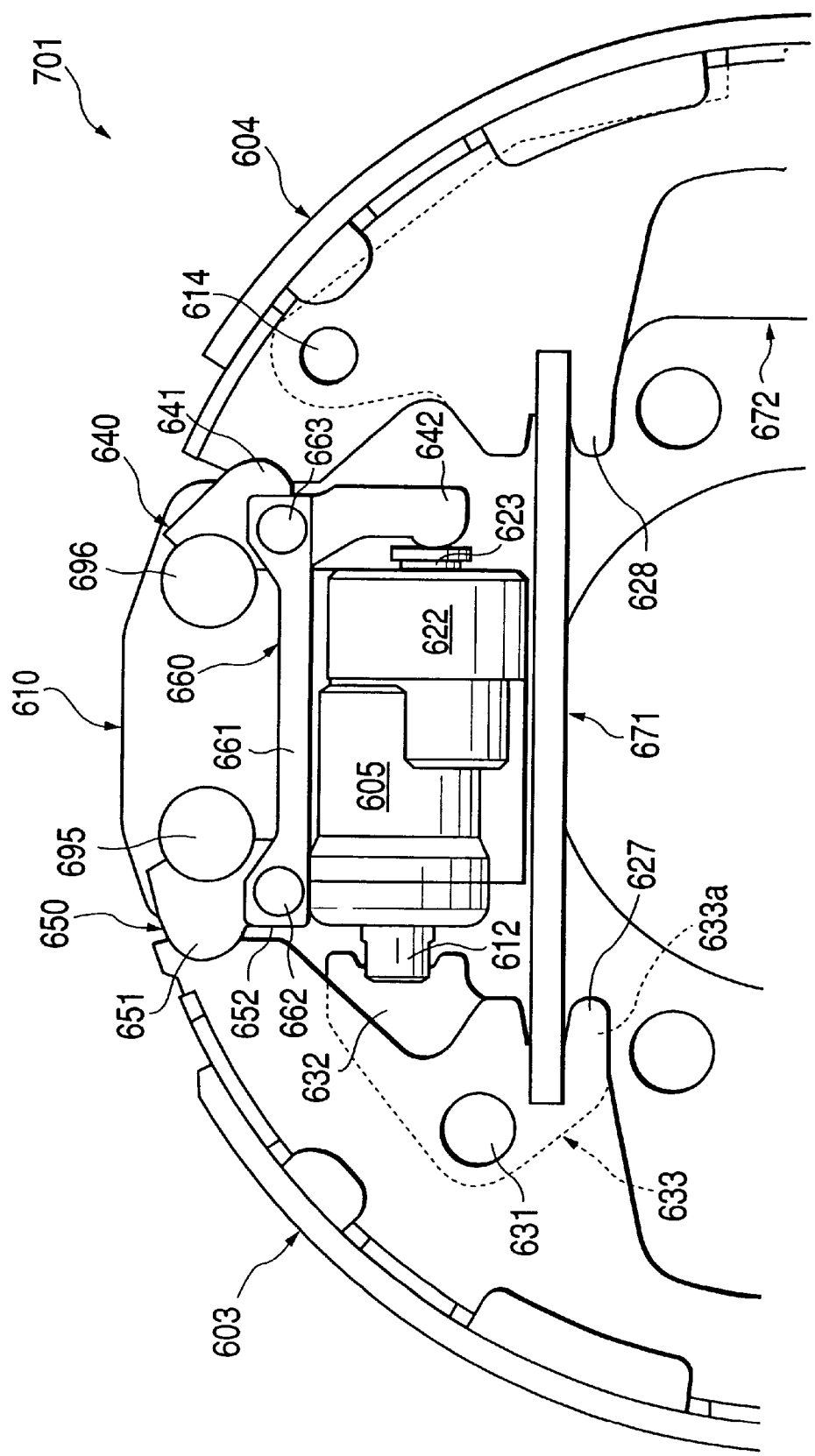
FIG. 12 is an enlarged, front view showing a portion of the drum brake of FIG. 11.
Figure 13:
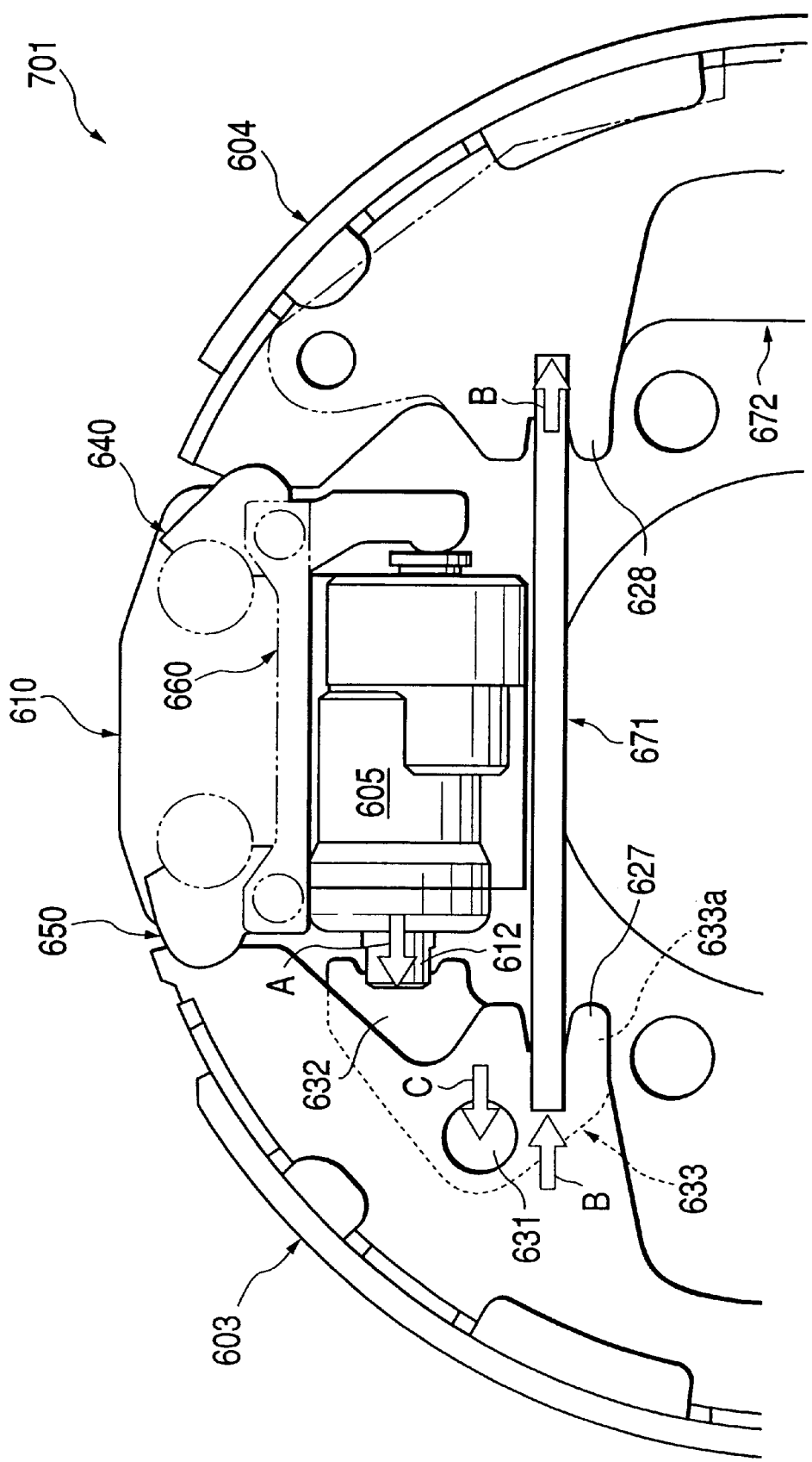
FIG. 13 is an enlarged, front view showing a portion of the drum brake of FIG. 11 that explains operation of a wheel cylinder, an input lever and a strut in the drum brake of FIG. 11.
Figure 14:
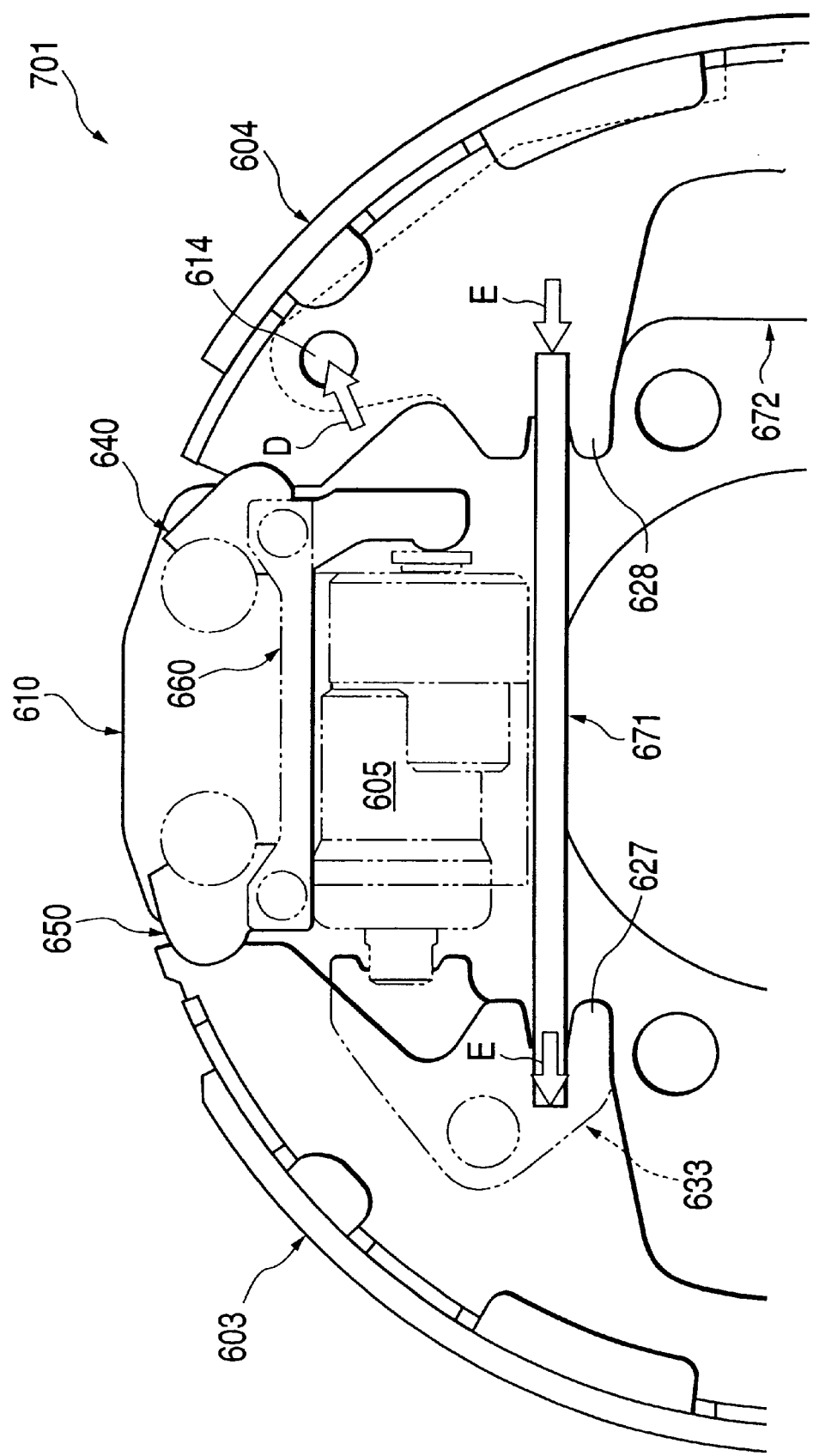
FIG. 14 is an enlarged, front view showing a portion of the drum brake of FIG. 11 that explains operation of a parking lever.
Figure 15:
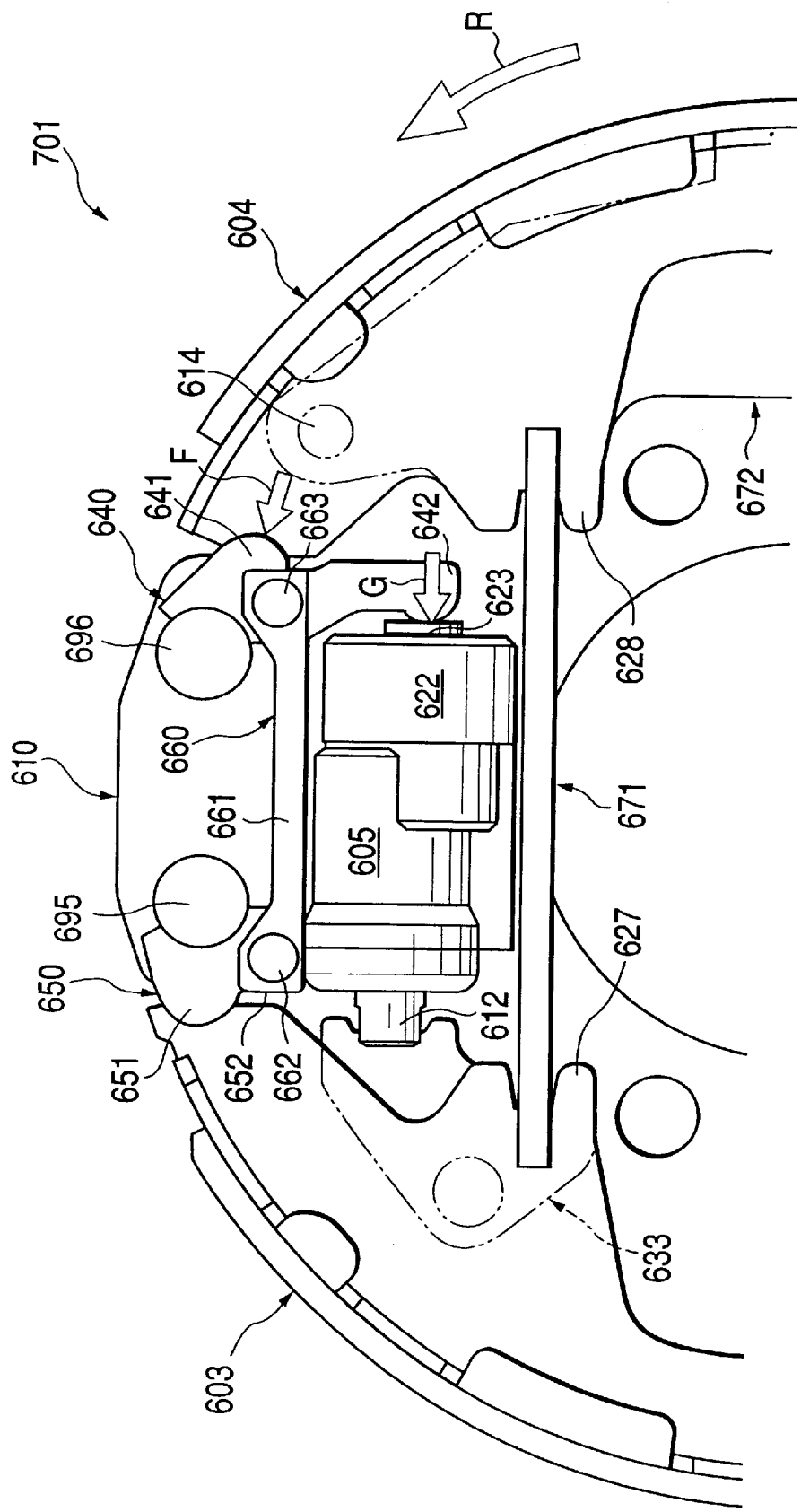
FIG. 15 is an enlarged, front view showing a portion of the drum brake of FIG. 11 that explains operation of a first control lever.
Figure 16:
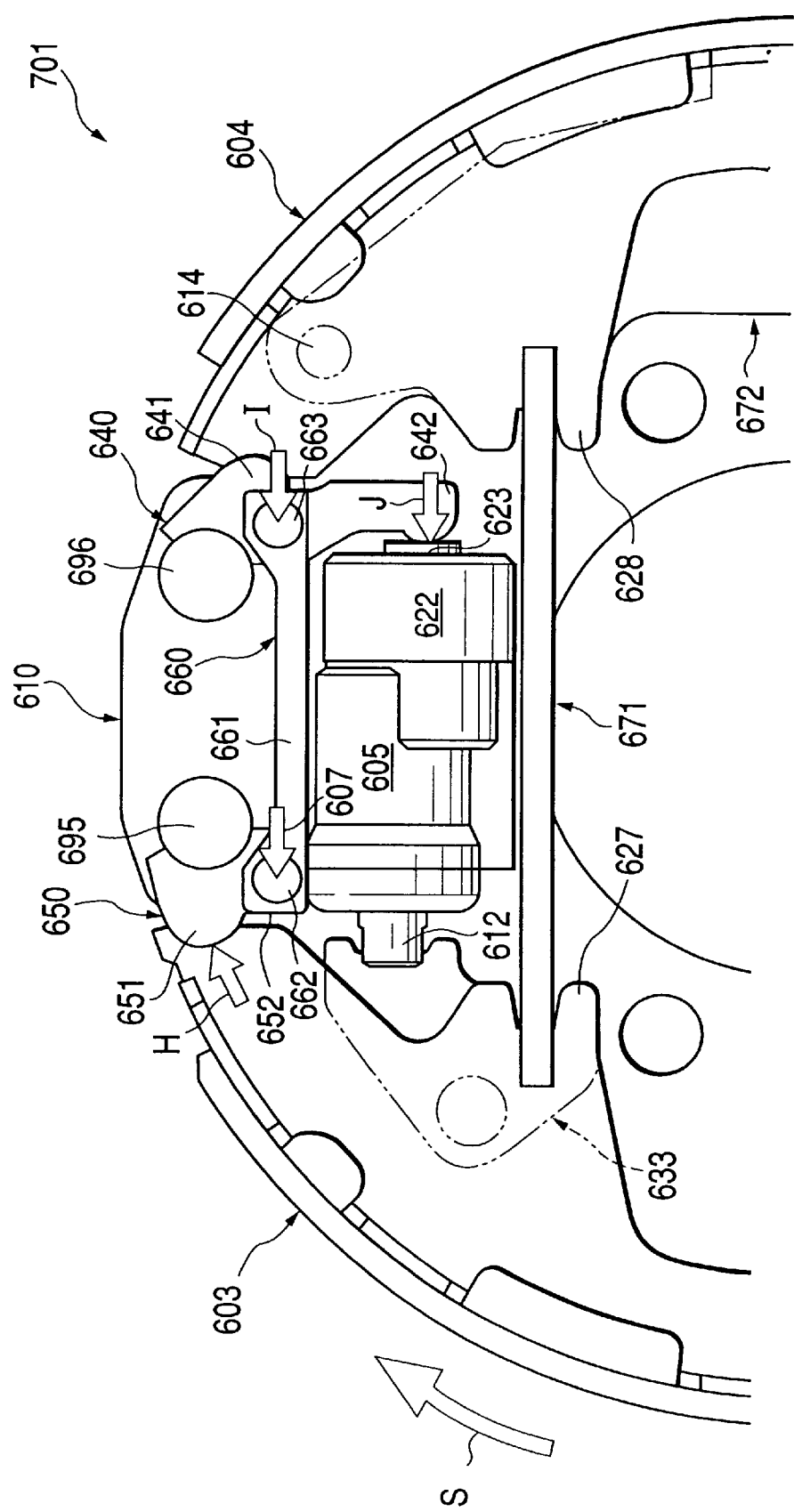
FIG. 16 is an enlarged, front view showing a portion of the drum brake of FIG. 11 that explains operation of a second control lever and a coupling link.

FIG. 11 is a front view showing the duo servo drum brake of the fourth embodiment of the present invention, FIG. 12 is an enlarged, front view showing a portion of the drum brake of FIG. 11, FIG. 13 is an enlarged, front view showing a portion of the drum brake of FIG. 11 that explains operation of a parking lever, FIG. 14 is an enlarged, front view showing a portion of the drum brake FIG. 11 that explains operation of a parking lever, FIG. 15 is an enlarged, front view showing a portion of the drum brake of FIG. 11 that explains operation of a first control lever, and FIG. 16 is an enlarged, front view showing a portion of the drum brake of FIG. 11 that explains operation of a second control lever and a coupling link.

In the description that follows, "upstream side or end" means a side or end located upstream (i.e., in a forward rotation direction, or counterclockwise in FIGS. 11 and 12) of the brake drum. "Downstream side or end" means a side or end located downstream (i.e., in a backward rotation direction) of the brake drum; "radially inward" means towards a center of a backing plate. "Radially outward" means towards an outside of the backing plate.

As shown in FIGS. 11 and 12, a duo servo drum brake 701 includes a brake drum (not shown) that rotates counterclockwise (in a direction of an arrow R), i.e., in a forward direction. A primary brake shoe 603 and a secondary brake shoe 604 are oppositely disposed within the brake drum while being supported on a backing plate 607 in a floating anchor manner.

An adjuster 606 is interposed between a downstream end 654 of the primary brake shoe 603 and an upstream end 655 of the secondary brake shoe 604. The adjuster 606 adjusts a clearance between the brake shoes 603 and 604 and a slide surface of the brake drum. A braking reaction force acting on the primary brake shoe 603 is applied to the upstream side of the secondary brake shoe 604, pressing the secondary brake shoe 604 against the brake drum. In the duo servo drum brake 701 of the fourth embodiment, both the primary brake shoe 603 and the secondary brake shoe 604 function as leading shoes.

A strut 671 formed of a thick metal plate is interposed between an engaging part 627 of the primary brake shoe 603 and an engaging part 628 of the secondary brake shoe 604. When the strut 671 is pushed towards the secondary brake shoe 604, the secondary brake shoe 604 is pressed against the brake drum. When the strut 671 is pushed towards the primary brake shoe 603, the primary brake shoe 603 is pressed against the brake drum.

An anchor block 610 is mounted on a backing plate 607 between the upstream end of the primary brake shoe 603 and the downstream end of the secondary brake shoe 604.

An anchor pin 696 stands erect at an end of anchor block 610 closer to the secondary brake shoe 604, and receives a braking reaction force that acts on the secondary brake shoe 604 when the brake drum rotates in the forward direction (counterclockwise in FIG. 12). An anchor pin 695 stands erect at an end of anchor block 610 closer to the primary brake shoe 603, and receives a braking reaction force which acts on the primary brake shoe 603 when the brake drum rotates in the backward direction (clockwise in FIG. 12).

A parking lever 672 is used for operating the duo servo drum brake 701 as a parking brake. A distal end of the parking lever 672 is supported by a support shaft 614 and is rotatable with respect to a web 604a of the secondary brake shoe 604.

A wheel cylinder (pressing means) 605 is mounted on a backing plate 607 at a location radially closer to a center of the backing plate 607 than the anchor block 610. When a brake pedal of a vehicle incorporating the duo servo drum brake 701 is depressed, a drive piston 612 of the wheel cylinder 605 is displaced towards the primary brake shoe 603 by a hydraulic pressure based on a pressing force on the brake pedal.

A controller (control means) 622 is mounted on the end of the wheel cylinder 605 closer to the secondary brake shoe 604. Operation of the wheel cylinder 605 is controlled by the control unit 622. A control rod 623 extends from the wheel cylinder 605 near the controller 622 towards the secondary brake shoe 604. When the control rod 623 is displaced toward the primary brake shoe 603, the hydraulic pressure applied to the drive piston 612 is reduced. A biasing means, e.g., a spring, constantly biases the control rod 623 towards the secondary brake shoe 604.

An input lever 633 formed of a thick metal plate is rotatably supported on a web 603a of the primary brake shoe 603 by a support shaft 631. The input lever 633 is rotatable in a plane parallel to a surface of the backing plate 607. A radially outward end 632 of the input lever 633 comes in contact with a leading end of the drive piston 612, while a radially inward end 633a of the input lever 633 is in contact with an end of the strut 671.

When the drive piston 612 is displaced towards the primary brake shoe 603, the input lever 633 turns counterclockwise in FIG. 12 about the support shaft 631, and the radially inward end 633a is displaced towards the secondary brake shoe 604.

A first control lever 640 is rotatably coupled to the anchor pin 696 so as to rotate in a plane parallel to the surface of the backing plate 607. The first control lever 640 is machined from a metal block. The downstream end of the secondary brake shoe 604 is brought into contact with a base end 641 of the first control lever 640.

When the secondary brake shoe 604 is pressed against the brake drum during a forward rotation of the brake drum, the following operation occurs: a braking reaction force, which acts on the first anchor pin 696 from the secondary brake shoe 604, is applied to the base end 641 of the first control lever 640; the first control lever 640 turns clockwise about the anchor pin 696; and a radially inward swing end 642 of the first control lever 640 pushes the control rod 623 towards the primary brake shoe 603.

Similarly, a second control lever 650 is rotatably coupled to the anchor pin 695 such that it may rotate in a plane parallel to a surface of the backing plate 607. The second control lever 650 is formed of a thick metal plate. The upstream end of the primary brake shoe 603 is in contact with a base end 651 of the second control lever 650.

When the primary brake shoe 603 is pressed against the brake drum during the backward rotation of the brake drum, the following occurs: a braking reaction force, which acts on the anchor pin 695 from the primary brake shoe 603, is applied to the base end 651 of the second control lever 650; the second control lever 650 turns clockwise about the anchor pin 695; and a radially inward swing end 652 of the second control lever 650 pushes the radially inward swing end 652 towards the primary brake shoe 603.

The first and second control levers 640 and 650 are coupled to each other by a coupling link 660, which is formed as a narrow plate. A main portion 661 of the coupling link 660 extends in the clearance between the anchor block 610 and the wheel cylinder 605. An end 662 of the coupling link 660 at the side of the primary brake shoe 603 is pivotally supported at the radially inward swing end 652 of the second control lever 650. An end 663 of the coupling link 660 at the side of the primary brake shoe 603 is pivotally supported at a center position of the first control lever 640 (when viewed longitudinally). When the second control lever 650 turns about the anchor pin 695, the first control lever 640 turns about the anchor pin 696 in the same direction.

The operation duo servo drum brake 701 will be described with reference to FIGS. 13 through 16.

A brake pedal of the vehicle using the duo servo drum brakes 701 is depressed. A hydraulic pressure, which depends on a force applied by a driver to a brake pedal acts on the wheel cylinder 605. The drive piston 612 pushes the radially outward end 632 of the input lever 633 towards the primary brake shoe 603 by a pushing force A proportional to the hydraulic pressure (as shown in FIG. 13).

The input lever 633 turns counterclockwise about the support shaft 631. The radially inward end 633a pushes the strut 671 towards the secondary brake shoe 604 with a force that is a product of the pushing force A and a leverage of the input lever 633. Therefore, the secondary brake shoe 604 presses against the brake drum.

At the same time, a reaction force C, generated when the strut 671 is pushed by a force B, acts on the support shaft 631 of the input lever 633. Therefore, the support shaft 631 presses the primary brake shoe 603 against the brake drum.

Thus, the primary brake shoe 603 and the secondary brake shoe 604 are both pressed against the brake drum, and the brake drum is braked as it turns. A braking reaction force acting on the primary brake shoe 603 is applied to the upstream side of the secondary brake shoe 604. The braking force due to the secondary brake shoe 604 is increased, and the braking force of the drum brake is amplified.

To operate the duo servo drum brake 701 in a parking brake mode, a swing end 615 of the parking lever 672 (see FIG. 11) is displaced towards the primary brake shoe 603. In turn, the parking lever 672 turns clockwise about the end of the strut 671 located closer to the secondary brake shoe 604, and the support shaft 614, and, therefore, the secondary brake shoe 604 is pressed against the brake drum as indicated by an arrow D (see FIG. 14). At the same time, the parking lever 672 pushes the strut 671 towards the primary brake shoe 603 as indicated by an arrow E, thereby pressing the primary brake shoe 603 against the brake drum. Thus, the brake drum is braked, and the parking brake is operated.

When the brake pedal is depressed and the secondary brake shoe 604 is pressed against the brake drum, a braking reaction force F from the secondary brake shoe 604 acts on the anchor pin 696 through the base end 641 of the first control lever 640 (see FIG. 15). Also, the first control lever 640 turns clockwise about the anchor pin 696.

Then, the radially inward swing end 642 of the first control lever 640 is displaced towards the primary brake shoe 603, and the control rod 623 is pushed towards the primary brake shoe 603 by a force G, while resisting the biasing force of the urging means (spring) (not shown). The force G is the product of the braking reaction force F and a leverage of the first control lever 640. When the control rod 623 is pushed, the control unit 622 reduces the hydraulic pressure supplied to the wheel cylinder 605 through a hydraulic pressure control circuit included in the control unit, and the drive piston 612 reduces the pushing force applied to the input lever 633. In turn, the reduction in the pushing force causes the wheel cylinder 605 to push the primary brake shoe 603 and the secondary brake shoe 604 against the brake drum. The braking force generated by the duo servo drum brake 701 is thus reduced.

With the reduction of the braking force, the braking reaction force F acting on the secondary brake shoe 604 is also reduced; the force G by which the piston rod 642 pushes the control rod 623 is also reduced; the biasing means (not shown) returns the control rod 623 to its original position; and the hydraulic pressure in the wheel cylinder 605 is restored. Thus, the duo servo drum brake 701 adjusts the braking force automatically: when the braking force due to the primary brake shoe 603 and the secondary brake shoe 604 exceeds a predetermined value, the drum brake 701 reduces the braking force, and when the braking force falls below a predetermined value, it increases the braking force.

When the vehicle moves backward, the brake drum rotates clockwise (in the backward direction) as indicated by an arrow S (see FIG. 16). If the driver depresses the brake pedal, a braking reaction force H, which acts on the primary brake shoe 603 when it is pressed against the brake drum, acts on the anchor pin 695 through the base end 651 of the second control lever 650. In turn, the second control lever 650 turns clockwise about the anchor pin 695. A pushing force I pushes the coupling link 660 towards the primary brake shoe 603. The pushing force I is a product of the braking reaction force H and a leverage of the second control lever 650.

When the coupling link 660 moves towards the primary brake shoe 603, the first control lever 640, which is coupled to second control lever 650 by the coupling link 660, turns clockwise about the anchor pin 696 to push the control rod 623 towards the primary brake shoe 603.

Thus, the duo servo drum brake 701 also adjusts the braking force automatically when the brake drum is turned in the backward direction. That is, when the braking force due to the primary brake shoe 603 and the secondary brake shoe 604 exceeds a predetermined value, the drum brake 701 reduces the braking force, and when the braking force falls below a predetermined value, it increases the braking force.

A control characteristic for controlling of the control unit 622 by turning the second control lever 650 is optimized by properly selecting the leverage of the second control lever 650 and the position at which the radially inward end 663 is coupled to the first control lever 640.

As described above, irrespective of the rotational direction of the brake drum, i.e., the forward and backward directions, the duo servo drum brake 701 of the fourth embodiment rotates the first control lever 640 and the second control lever 650 due to the braking reaction force transmitted from the primary brake shoe 603 or from the secondary brake shoe 604 towards the anchor pin 695 or towards the anchor pin 696, pushing the control rod 623 and controlling the pushing or pressing forces that press the primary brake shoe 603 and the secondary brake shoe 604 against the brake drum. Therefore, the duo servo drum brake 701 can stabilize the braking force to suppress an increase in the braking force in excess of a predetermined value.

In the above-mentioned embodiment, the primary and secondary brake shoes 603 and 604 are pressed against the brake drum by using the wheel cylinder 605, which is operated by hydraulic fluid pressure. Alternatively, an air-pressure driven actuator or a motor-driven actuator may be used.

The duo servo drum brake uses the coupling link 660 to rotate the first control lever 640 through the rotation of the second control lever 650 to push the control rod 623. The control rod 623 may also be directly pushed, provided that a different shape of the second control lever 650 is used.

As described above, during the braking operation, the anchor reaction force, which is derived from the secondary brake shoe 604 and depends on a braking effect, is distributed at a predetermined ratio to the anchor portion through the input lever 630. Compared to an anchor portion that is formed integral with a cylinder body of a wheel cylinder, where the anchor reaction force fully acts on the wheel cylinder, load durability of the wheel cylinder 605 of the present invention can be smaller than an anchor reaction force generated by the secondary brake shoe 604. Therefore, the cylinder body of the wheel cylinder 605 may be made of a material whose strength is not high, and whose price is low. The thickness of the cylinder body 629 may be reduced. Thus, the cost of manufacturing is reduced, and the size and weight of the drum brake are reduced.

In the structure of the wheel cylinder 605, the drive piston 612 and a control piston are serially aligned with each other so as to be displaced along the same axial line. Therefore, compared to a wheel cylinder having these pistons arranged in parallel, the wheel cylinder 605 of the fourth embodiment has a smaller diameter. Formation of a hydraulic fluid passage for communicating between a pressure chamber and a control chamber is also easy. The structure of the wheel cylinder 605 may be simplified.

When the drum brake 701 is in the braking mode and the anchor reaction force from the secondary brake shoe 604 reaches a predetermined braking force magnification (i.e., the braking effect reaches a predetermined magnification), the control piston is displaced towards the control chamber by the anchor reaction force applied to the control piston through the first control lever 640. As a result of the displacement of the control piston, the hydraulic fluid passage formed in the control chamber is closed by the valve to stop the supply of the hydraulic pressure from the control chamber to the pressure chamber. Thus, the hydraulic pressure within the control chamber is kept at a fixed level.

When the drum brake 701 is operated and the control piston cuts off the supply of the hydraulic pressure to the pressure chamber, if the braking effect is reduced, the drum brake 701 operates as follows: the anchor reaction force applied to the control piston through the first control lever 640 is reduced; the control piston is displaced towards the first control lever 640 by the hydraulic pressure supplied from the master cylinder; the valve moves away from the conical valve seat of the hydraulic fluid passage; and the supply of the hydraulic pressure from the control chamber to the pressure chamber starts again.

As described above, the control piston controls the supply of the hydraulic pressure to the pressure chamber in accordance with the anchor reaction force. Through the control piston, the braking effect is stabilized so that the anchor reaction force is set at a predetermined braking force magnification with respect to the input braking force derived from the master cylinder. Therefore, the braking effect fluctuation is suppressed.

The drum brake 701 can control the operation of the wheel cylinder 605 by the anchor reaction force from the brake shoes 603 and 604. The structure of the wheel cylinder 605 may be simplified, and the size and weight of the drum brake 701 are reduced. When the present invention is applied to the duo servo drum brake, the resultant drum brake has many advantages. The braking force is high, and the braking effect is stable. Assembly of the parking brake into the drum brake is easy. The size and cost of the drum brake are reduced.

When the pressure chamber is tightly closed by the control piston, if the hydraulic pressure within the pressure chamber rises, fluctuation of the brake drum 701 and the pressing force applied to the primary brake shoe 603 by the drive piston 612 increases, the braking effect increases. The so-called braking effect fluctuation may occur.

In this case, the wheel cylinder 605 operates as follows. When the hydraulic fluid passage of the control piston is closed by the valve, and the pressure chamber is tightly closed and is in a pressure holding state, the hydraulic pressure within the pressure chamber is increased and exceeds the hydraulic pressure within the control chamber. A seal in the clearance around the control piston relieves the brake fluid from the pressure chamber into the control chamber, suppressing an increase of the hydraulic pressure within the pressure chamber and suppressing the braking effect fluctuation.

If the brake pedal is released and the supply of the hydraulic pressure from the master cylinder to the control chamber is removed when the pressure chamber is tightly closed by the control piston, i.e., in a hydraulic pressure holding state, the hydraulic pressure in the pressure chamber is higher than the hydraulic pressure in the control chamber. Therefore, the seal located in the clearance around the control piston relieves the brake fluid from the pressure chamber into the control chamber, even if the hydraulic fluid passage of the control piston is closed by the valve, and decreases the hydraulic pressure in the pressure chamber.

The advantages the wheel cylinder 605 are as follows. The biasing means or the spring, which biases the valve against the hydraulic fluid passage, may have a large biasing force since the biasing force of the spring may be selected to increase the sealing capability and stability when the hydraulic fluid passage is closed, while ignoring the response when the hydraulic fluid passage is opened. With the spring having a large biasing force, a high degree of contact of the valve with the hydraulic fluid passage is secured, and a closed state of the hydraulic fluid passage is more stably maintained when the hydraulic fluid passage is closed by the valve. Additionally, there is no need to use elastic material, e.g., rubber, for making the valve since the use of the spring with a large biasing force makes the valve contact the hydraulic fluid passage more tightly.

In other words, the valve may be made of a material of high mechanical strength, e.g., metal. Therefore, the wheel cylinder 605 has good sealing performance, satisfactory durability, and good operational reliability.

During braking, if the anchor reaction force from the secondary brake shoe 604 reaches a predetermined braking force magnification (i.e., the braking effect reaches a predetermined magnification), the anchor reaction force acting on the control piston through the first control lever 640 displaces the control piston towards the control chamber. The valve then sits on the conical valve seat of the valve seat block to block pressure communication between the control chamber and the pressure chamber, cutting off the supply of the hydraulic pressure to the pressure chamber. Thus, the hydraulic pressure is kept at a fixed level within the pressure chamber.

When the supply of the hydraulic pressure to the pressure chamber by the replacement of the control piston to the control chamber is blocked, the braking effect is reduced, and the anchor reaction force acting on the control piston through the first control lever 640 becomes weak. The hydraulic pressure from the master cylinder pushes against the control piston in the forward direction (towards the control lever). The valve moves away from the valve seat block to open the hydraulic fluid passage and to provide pressure communication between the control chamber and the pressure chamber, and the supply of the hydraulic pressure from the control chamber to the pressure chamber starts again.

During braking, when the supply of the hydraulic pressure to the pressure chamber is cut off as a result of the displacement of the control piston toward the control chamber, if the hydraulic pressure of the master cylinder rises (i.e., the brake pedal is further depressed), the increase of the hydraulic pressure within the control chamber pushes the control piston back towards first the control lever 640. The valve moves away from the valve seat block to open the hydraulic fluid passage to allow pressure communication between the control chamber and the pressure chamber. As a result, the supply of the hydraulic pressure from the control chamber to the pressure chamber starts again.

As described above, the control piston controls the supply of the hydraulic pressure to the pressure chamber in accordance with the anchor reaction force. Therefore, the braking effect is stabilized so that the anchor reaction force is set at a predetermined magnification with respect to the input from the master cylinder, and the braking effect fluctuation is suppressed.

During braking, when the supply of the hydraulic pressure to the pressure chamber is cut off as a result of the displacement of the control piston towards the control chamber, if the braking effect (brake torque) increases, the anchor reaction force applied to the control piston through the first control lever 640 increases further, and the control piston is further displaced towards the first control lever 640 by the hydraulic pressure. The valve seat block, which is slidably positioned within the control piston, is moved to the inside bottom of a cylindrical part of the control piston while carrying the valve seat thereon. The displacement of the valve seat block pressurizes the fluid stagnating in the gap between the valve seat block and the inside bottom of the cylindrical part of the control piston, and the fluid moves towards the control chamber through the sliding clearance between the control piston and the control chamber. Therefore, the stroke of the control piston is increased by a distance corresponding to the movement of the brake fluid caused by the displacement of the valve seat block. In a situation requiring an increase of the hydraulic pressure in the pressure chamber, the amount of the brake fluid supplied to the control chamber by the valve is increased when the valve sits on the conical valve seat of the valve seat block. Further, the opening and closing motions of the valve are infrequent. The difference in the hydraulic pressure between the pressure chamber and the control chamber is reduced when the hydraulic fluid passage is opened by the valve. The result is to lessen the impact caused when the hydraulic fluid passage is opened by the valve.

The drum brake 701 improves the durability of the valve by reducing the frequency of openings and closing of the valve, and stabilizes the operation of the wheel cylinder 605 by eliminating the fluctuation of the hydraulic pressure, which arises from great differences in hydraulic pressure between the pressure chamber and the control chamber.

In the drum brake 701 of the present invention, the anchor block 610 and the anchor pins 696, 695, which form the anchor portion, are separate component parts. Therefore, the anchor pins 696, 695 may be machined and finished separate from the anchor block 610. The anchor pins 696, 695 both have a simple cylindrical shape. The outer surfaces of the anchor pins 696, 695, which serve as the contact surfaces in contact with the brake shoes 604, 604, may be finished easily and precisely without using a machine used exclusively for the surface finishing.

The anchor block 610 includes contact walls. The contact walls support the sides of the anchor pins 696, 695, which are opposite to the sides of the anchor pins 696, 695 located closer to the brake shoes 603, 604. Therefore, the anchor reaction force acting on the anchor pins 696, 695 can be efficiently transferred to the anchor block 610. Even if the anchor pins 696, 695 are relatively small in diameter, they can endure a strong anchor reaction force. This leads to size and weight reduction of the anchor pins 696, 695.

Further, heat treatment may be applied only to a pin whose hardness must be in excess of a predetermined value, since it is brought into contact with the end of the brake shoe 603 or 604.

In the drum brake 701 of the duo servo type, an anchor portion of the double anchor type having two anchor pins 696, 695 may be manufactured relatively simply, i.e., by merely forming two holes for receiving the anchor pins 696, 695 in the anchor block 610 in dimensional connection with the space between the opposed ends of the brake shoes 603, 604.

Thus, the anchor portion may be reduced in size and weight, and forming component parts is easy. A minimum heat treatment is required. Therefore, the drum brake 701 is high in mechanical precision and quality, and the cost to manufacture it is low.

Irrespective of the rotational directions of the brake drum, i.e., forward and backward directions, the duo servo drum brake of the present invention turns the first control lever 640 and the second control lever 650 due to the braking reaction force transmitted from the primary brake shoe 603 or the secondary brake shoe 604 to the anchor pin 695 or the anchor pin 696, to thereby operate the control unit 622 and to control the pushing or pressing forces that press the primary brake shoe 603 and the secondary brake shoe 604 against the brake drum.

Therefore, the duo servo drum brake adjusts the braking force automatically. That is, when the braking force of the primary brake shoe 603 and the secondary brake shoe 604 exceeds a predetermined value, the drum brake 701 reduces the braking force. When the braking force falls below a predetermined value, it increases the braking force. The duo servo drum brake 701 having such an automatic braking-force adjusting function therefore produces a stable braking force.

The present invention is also applicable to drum brakes other than the duo servo type drum brake.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A drum brake comprising:

a first brake shoe having a first end;

a second brake shoe having a first end and disposed opposite the first brake shoe within a brake drum;

a backing plate supporting the first and second brake shoes;

a pressure chamber;

a control piston for supplying a hydraulic pressure to the pressure chamber in response to a braking reaction force from the second brake shoe and movable to and from the second brake shoe;

a wheel cylinder disposed between the first end of the first brake shoe and the first end of the second brake shoe, the wheel cylinder including a drive piston for pressing the first and the second brake shoes against an inner surface of the brake drum when actuated by the hydraulic pressure from the pressure chamber, the drive piston having a base end in the pressure chamber and a leading end facing the first end of the first brake shoe, the drive piston being movable to and from the first brake shoe by the hydraulic pressure supplied to the pressure chamber;

an anchor portion disposed between the first ends of the first and second brake shoes for receiving an anchor reaction force from the second brake shoe; and a control lever for distributing the anchor reaction force to the anchor portion and to the control piston when the anchor reaction force reaches a predetermined braking force magnification, wherein the wheel cylinder further includes:
- a control chamber behind the pressure chamber and defined by a cylinder wall of the wheel cylinder, the control chamber being pressurized by a hydraulic pressure from a master cylinder,
- wherein the control piston is aligned with the drive piston and has a base end of the control piston in the control chamber, while a leading end of the control piston faces the first end of the second brake shoe, and
- wherein the control piston cuts off a supply of the hydraulic pressure to the pressure chamber when the control piston is displaced into the control chamber by the anchor reaction force.

2. The drum brake of claim 1, further including:

a valve resiliently supported in the control chamber such that when the control piston is displaced into the control chamber by the control lever, the control piston presses against a fluid passage opened in the base end of the control piston to close the fluid passage and to block a flow of brake fluid into the pressure chamber; and a seal for slidably holding the control piston and for closing a gap between the control piston and the cylinder wall, wherein the seal relieves a brake fluid from the pressure chamber to the control chamber when a hydraulic pressure within the control chamber acting on one side of the seal becomes lower than a hydraulic pressure of the pressure chamber acting on another side of the seal.

3. A drum brake comprising:

a first brake shoe having a first end;

a second brake shoe having a first end and disposed opposite the first brake shoe on a backing plate within a brake drum, the first and second brake shoes adapted to press against the brake drum;

a wheel cylinder disposed between the first end of the first brake shoe and the first end of the second brake shoe;

a backing plate;

an anchor portion fixedly mounted on the backing plate for receiving anchor reaction forces from the brake shoes;

a control lever disposed between the first end of the second brake shoe and the anchor portion; and a master cylinder for providing hydraulic pressure;

wherein the wheel cylinder includes:
- a hydraulic pressure chamber;
- a drive piston having a base end received in a pressure chamber and a leading end facing the first end of the first brake shoe, the drive piston being movable to and from the first brake shoe by a hydraulic pressure in the pressure chamber;
- a control chamber behind the pressure chamber and defined by a cylinder wall of the wheel cylinder, the control chamber receiving the hydraulic pressure from the master cylinder;
- a control piston aligned with the drive piston and having a base end of the control piston in the control chamber and a leading end dynamically engaging the control lever,
- wherein the control piston is displaced towards the control chamber by an anchor reaction force to control the hydraulic pressure in the pressure chamber;
- a first hydraulic fluid passage extending from an inside bottom of a cylindrical part of the control piston to a circumferential outer surface of the control piston, wherein the cylindrical part is located closer to the control chamber;
- a second hydraulic fluid passage passing through the cylinder wall and connecting the first hydraulic fluid passage to the control chamber;
- a valve seat block biased away from the inside bottom of the cylindrical part by a damper spring, wherein the damper spring is slidably placed within the cylindrical part and has an end on an inside bottom of the cylindrical part; and
- a valve placed within the control chamber and elastically supported by a valve spring having an end on a bottom wall of the control chamber,
- wherein the valve contacts on the valve seat block and closes the first hydraulic fluid passage when the control piston is displaced towards the control chamber and past a predetermined point.

4. A drum brake comprising:

a first brake shoe having a first end;

a second brake shoe having a first end and disposed opposite the first brake shoe within a brake drum and movable to and from an inner surface of the brake drum;

a wheel cylinder disposed between the first end of the first brake shoe and the first end of the second brake shoe;

an anchor portion for receiving anchor reaction forces, the anchor portion including first and second cylindrical anchor pins, a control lever being provided between at least one of said anchor pins and the first ends of the first and second brake shoes for distributing the anchor reaction forces to the at least one anchor pin and the wheel cylinder, the anchor portion further including:
- an anchor block mounted on a backing plate for supporting the first and second brake shoes,
- wherein the first and second anchor pins are inserted into holes formed in the anchor block; and
- first and second contact walls formed on both sides of the anchor block such that the first contact wall supports the first anchor pin on a side opposite the first end of the first brake shoe, and the second contact wall supports the second anchor pin on a side opposite the first end of the second brake shoe.

5. A duo servo drum brake comprising:

a primary brake shoe disposed to press against a brake drum;

a secondary brake shoe disposed opposite the primary brake shoe within the brake drum, wherein the secondary brake shoe presses against the brake drum due to braking reaction force acting on the primary brake shoe, and wherein a braking reaction force from the secondary brake shoe is received by an anchor located downstream of the secondary brake shoe;

a wheel cylinder;

a controller for controlling operation of the wheel cylinder;

a first anchor pin downstream of the secondary brake shoe;

a first rotatable control bar supported by the first anchor pin for receiving a braking force acting on the first anchor pin from the secondary brake shoe at a base end of the first rotatable control bar when the brake drum rotates in a forward direction;

a second anchor pin upstream of the primary brake shoe; and a second rotatable control bar supported by the second anchor pin for receiving a braking force acting on the second anchor pin from the primary brake shoe at a base end of the second rotatable control bar when the brake drum rotates in a backward direction, wherein the first and the second rotatable control bars operate the controller to control a pressing force pressing the primary brake shoe and the secondary brake shoe against the brake drum.

6. A drum brake comprising:

a brake drum;

a backing plate;

a first brake shoe having a first end and disposed within the brake drum while being supported by the backing plate;

a second brake shoe having a first end, and disposed within the brake drum opposite the first brake shoe while being supported by the backing plate;

a wheel cylinder disposed within the brake drum;

a pressure chamber and a control chamber within the wheel cylinder;

a piston rod abutting the first brake shoe;

a drive piston slidably arranged within the pressure chamber and having a base end within the pressure chamber and a leading end coupled to the piston rod;

an anchor portion for receiving an anchor reaction force;

a control lever engaging the second brake shoe and the anchor portion; and a control piston slidably arranged within the control chamber, axially aligned with the drive piston and having a base end within the control chamber and a leading end abutting the control lever, wherein the control piston cuts off a supply of hydraulic pressure to the pressure chamber when the control piston is displaced into the control chamber by the anchor reaction force.

7. The drum brake of claim 6, further including:

a valve movable within the control chamber;

a hydraulic fluid passage in the base end of the control piston; and a seal for slidably holding the control piston and for closing a gap between the control piston and the wheel cylinder, wherein the valve closes the hydraulic fluid passage when the control piston advances into the control chamber, and wherein the seal relieves a brake fluid from the pressure chamber to the control chamber when a hydraulic pressure in the pressure chamber is higher than a hydraulic pressure in the control chamber.

8. The drum brake of claim 6, further including:

a first hydraulic fluid passage in the base end of the control piston;

a second hydraulic fluid passage in a cylinder wall of the wheel cylinder and connected to the first hydraulic fluid passage;

a valve seat block;

a damper spring biasing the valve seat block away from the control piston; and a valve movable within the control chamber and elastically supported within the control chamber, wherein the valve sits on the valve seat block and closes the first hydraulic fluid passage when the control piston is pushed into the control chamber past a predetermined point.

9. The drum brake of claim 6, further including:

a first hole and a second hole in the anchor portion;

a first anchor pin inserted into the first hole for engaging the first end of the first brake shoe, the first anchor pin being axially aligned in a direction of an axis of the brake drum;

a second anchor pin inserted into the second hole for engaging the control lever, the second anchor pin being axially aligned in the direction of the axis of the brake drum;

a first contact wall for supporting the first anchor pin on a side opposite the first end of the first brake shoe; and a second contact wall for supporting the second anchor pin on a side opposite the control lever.

10. The drum brake of claim 9, further including:

a controller for controlling operation of the wheel cylinder;

a first rotatable control bar supported by the first anchor pin for receiving a braking force acting on the first anchor pin from the second brake shoe at a base end of the first rotatable control bar when the brake drum rotates in a forward direction;

a second anchor pin upstream of the first brake shoe; and a second rotatable control bar supported by the second anchor pin for receiving a braking force acting on the second anchor pin from the first brake shoe at a base end of the second rotatable control bar when the brake drum rotates in a backward direction, wherein the first and the second rotatable control bars operate the controller to control a force pressing the first brake shoe and the second brake shoe against the brake drum.

* * * * *